United States Patent
Hong et al.

(10) Patent No.: US 9,032,462 B2
(45) Date of Patent: May 12, 2015

(54) METHOD FOR TRANSMITTING/RECEIVING INTERNET-BASED CONTENT AND TRANSMITTER/RECEIVER USING SAME

(75) Inventors: Hotaek Hong, Seoul (KR); Jinpil Kim, Seoul (KR); Joonhui Lee, Seoul (KR); Hyeonjae Lee, Seoul (KR); Kyungho Kim, Seoul (KR); Kangsuk Huh, Seoul (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 13/642,318

(22) PCT Filed: Apr. 12, 2011

(86) PCT No.: PCT/KR2011/002597
§ 371 (c)(1),
(2), (4) Date: Feb. 1, 2013

(87) PCT Pub. No.: WO2011/132883
PCT Pub. Date: Oct. 27, 2011

(65) Prior Publication Data
US 2013/0167184 A1    Jun. 27, 2013

Related U.S. Application Data

(60) Provisional application No. 61/325,372, filed on Apr. 19, 2010, provisional application No. 61/325,373, filed on Apr. 19, 2010, provisional application No. 61/325,374, filed on Apr. 19, 2010, provisional application No. 61/325,377, filed on Apr. 19, 2010.

(51) Int. Cl.
*H04N 7/173* (2011.01)
*H04H 60/82* (2008.01)
(Continued)

(52) U.S. Cl.
CPC ........... *H04H 60/82* (2013.01); *H04N 21/8106* (2013.01); *H04N 21/6125* (2013.01); *H04N 21/23605* (2013.01); *H04N 21/816* (2013.01); *H04N 21/8547* (2013.01)

(58) Field of Classification Search
CPC ............ H04N 21/238; H04N 21/2381; H04N 21/236; H04N 21/23608; H04N 21/81; H04N 21/8541; H04N 21/8547; H04N 21/8106
USPC ....................... 725/109, 118, 86, 93
See application file for complete search history.

(56) References Cited

U.S. PATENT DOCUMENTS 7,248,590 B1 *  7/2007  Liu .......................... 370/395.64
7,530,086 B2 *  5/2009  Brassil ............................ 725/32
(Continued)

FOREIGN PATENT DOCUMENTS

KR    10-0711608    4/2007
KR    10-0837721    6/2008

*Primary Examiner* — James R Sheleheda
(74) *Attorney, Agent, or Firm* — McKenna Long & Aldridge LLP

(57) ABSTRACT

The present invention relates to a method for transmitting/receiving through a network such as the Internet, and to a transmitter/receiver using same, the transmission method comprising: converting content stored in a file format into a delivery format; and including the content converted into the delivery format in a payload of an IP packet and transmitting same, wherein one or more mdats, which are included in an mdat box of the file format, are cut according to a time window and sequentially included in the delivery format in the transforming step.

16 Claims, 25 Drawing Sheets

(51) Int. Cl.
*H04N 21/81* (2011.01)
*H04N 21/61* (2011.01)
*H04N 21/236* (2011.01)
*H04N 21/8547* (2011.01)

(56) References Cited

U.S. PATENT DOCUMENTS

| | | | |
|---|---|---|---|
| 7,804,826 B1 * | 9/2010 | Khalil et al. | 370/389 |
| 8,530,086 B2 * | 9/2013 | Hojo et al. | 429/213 |
| 2004/0243715 A1 * | 12/2004 | Yokoyama | 709/231 |
| 2007/0067796 A1 * | 3/2007 | Seo | 725/32 |
| 2011/0307545 A1 * | 12/2011 | Bouazizi | 709/203 |
| 2013/0042287 A1 * | 2/2013 | Hong et al. | 725/109 |
| 2013/0110977 A1 * | 5/2013 | Hong et al. | 709/218 |
| 2013/0125186 A1 * | 5/2013 | Lee et al. | 725/109 |
| 2013/0136144 A1 * | 5/2013 | Hong et al. | 370/474 |
| 2013/0167184 A1 * | 6/2013 | Hong et al. | 725/109 |
| 2013/0326571 A1 * | 12/2013 | Hong et al. | 725/109 |

* cited by examiner

FIG.6

| syntax | size | type |
|---|---|---|
| program_number | 16 | uimsbf |
| number_of_mdat | 8 | uimsbf |
| for (i=0; i<N; i++) { | | |
|   mdat_id | 13 | uimsbf |
|   reserved | 3 | bslbf |
|   mdat_type | 8 | uimsbf |
|   priority | 1 | bslbf |
|   reserved | 7 | bslbf |
|   start_time | 32 | uimsbf |
|   duration (or end_time) | 32 | uimsbf |
|   supplement_length | 8 | uimsbf |
|   for (j=0; j<M; j++) { | | |
|     supplement_data | 8 | uimsbf |
|   } | | |
| } | | |

FIG.8

| syntax | size | type |
|---|---|---|
| ISO_639_language_code | 24 | bslbf |
| subtitling_type | 4 | bslbf |
| aspect_ratio | 4 | bslbf |
| composition_page_id | 16 | bslbf |
| ancillary_page_id | 16 | bslbf |

FIG.10

| syntax | size | type |
|---|---|---|
| PSI/SI_info_id | 8 | uimsbf |
| version | 8 | uimsbf |
| number_of_programs | 8 | uimsbf |
| for (i=0; i<N; i++) { | | |
|   program_number | 16 | uimsbf |
|   number_of_mdat | 8 | uimsbf |
|   for (j=0; j<N1; j++) { | | |
|     mdat_id | 13 | uimsbf |
|     reserved | 3 | bslbf |
|     mdat_type | 8 | uimsbf |
|     priority | 1 | bslbf |
|     reserved | 7 | bslbf |
|     supplement_length | 8 | uimsbf |
|     for (k=0; k<N2; k++) { | | |
|       supplement_data | 8 | uimsbf |
|     } | | |
|   } | | |
| } | | |

FIG.11

| syntax | size | type |
|---|---|---|
| mdat_id | 13 | uimsbf |
| clock_reference_indicator | 1 | bslbf |
| reserved | 2 | bslbf |
| data_length | 16 | uimsbf |
| if (clock_reference_indicator =='1' ){ | | |
|   PCR_base | 33 | uimsbf |
|   reserved | 6 | bslbf |
|   PCR_extension | 9 | uimsbf |
| } | | |
| for (i=0; i<N; i++) { | | |
|    payload_data_byte | 8 | bslbf |
| } | | |

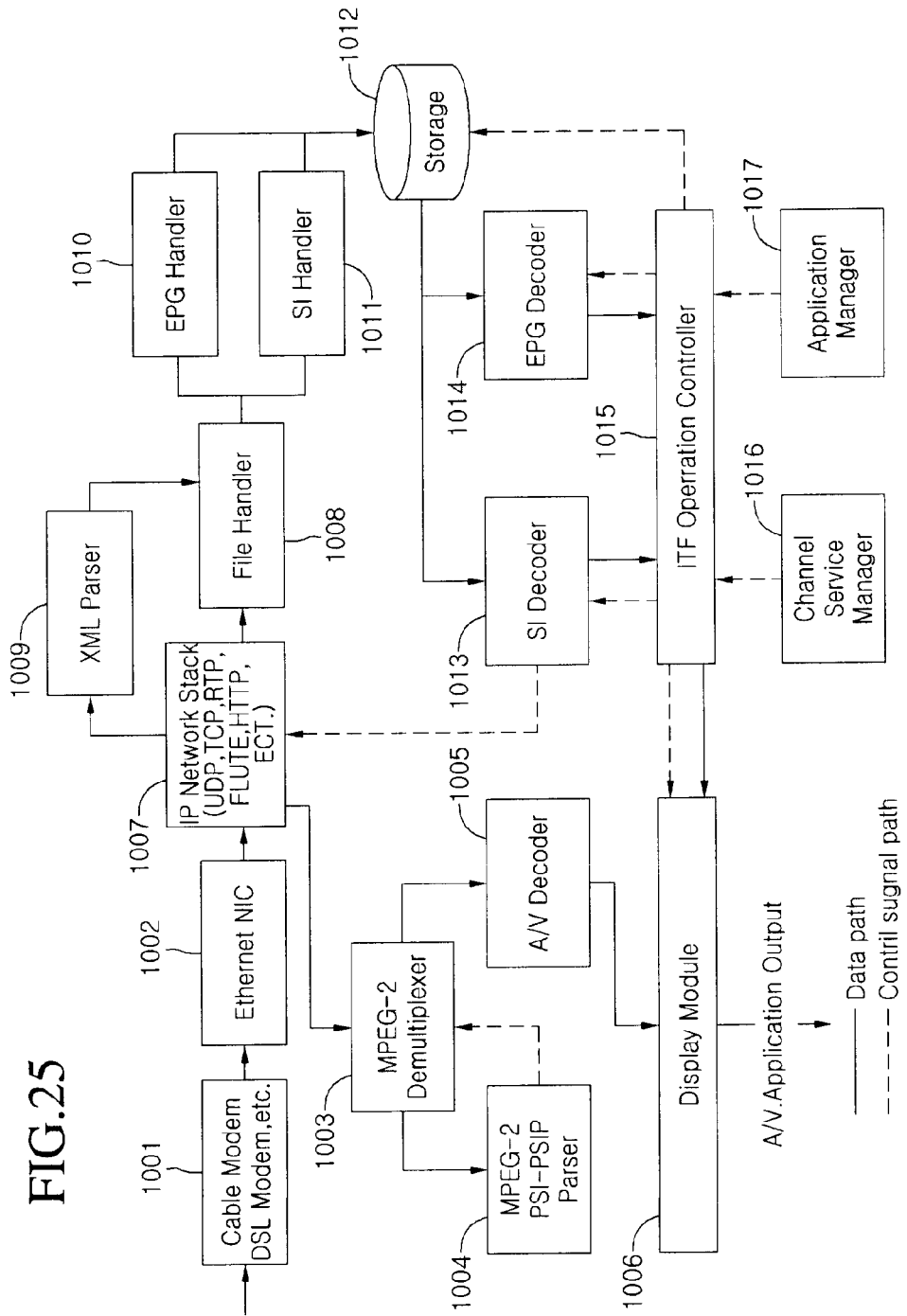

METHOD FOR TRANSMITTING/RECEIVING INTERNET-BASED CONTENT AND TRANSMITTER/RECEIVER USING SAME

This application claims the benefit of priority of PCT/KR2011/002597 filed on Apr. 12, 2011 and U.S. Provisional Application Nos. 61/325,372 filed on Apr. 19, 2010; 61/325,373 filed on Apr. 19, 2010; 61/325,374 filed on Apr. 19, 2010 and 61/325,377 filed on Apr. 19, 2010, all of which are incorporated by reference in their entirety herein.

TECHNICAL FIELD

The present invention relates to a method and device for transmitting/receiving various multimedia contents through the Internet.

BACKGROUND ART

Currently, digital broadcasts such as terrestrial wave, cable, satellite, or Digital Multimedia Broadcasting (DMB) stream AV contents mostly using MPEG-2 Transport Stream (TS).

Additionally, due to the recent rapid growth of the internet, a multimedia service providing contents by using an Internet Protocol (IP) network as a main transmission network is becomes active, and digital broadcasts are evolving in the direction that requires a large amount of transmission data, for example, stereo 3D video broadcast, Ultra High Definition (UHD) broadcast, multi-point 3D video broadcast, and hologram broadcast.

However, the MPGE-2 TS having a 188 byte fixed length packet may be inefficient in transmitting contents having a higher resolution than a typical HDTV through the IP network.

DISCLOSURE OF THE INVENTION

Technical Problem

Embodiments provide a contents delivery format having a structure of efficient transmission in an internet environment and a content file format having a structure of easy mutual conversion with the delivery format.

Embodiments also provide an efficient conversion method between the delivery format and a file format.

Embodiments also provide a method and device for transmitting/receiving contents, which receive and process contents having the delivery format and file format.

Technical Solution

In one embodiment, a method of transmitting contents through internet includes: converting contents stored in a file format into a delivery format; and including the contents converted in to the delivery format in payload of an IP packet and transmitting it, wherein the file format comprises an ftyp box for storing file type information, an mdat box for storing audio or video data, and a moon box for storing information on data stored in the mdat box; and the converting of the contents comprises cutting at least one mdat in the mdat box according to a time window and sequentially including it in the delivery format.

In another embodiment, a method of receiving contents through internet includes: converting contents received in a delivery format into a file format; and storing the contents converted into the file format, wherein the delivery format comprises mdat identification information for identifying an mdat received through an IP packet, and the converting of the contents comprises converting packet streams, which are received through the IP packet, into an mdat of the file format by using the mdat identification information in the delivery format.

In further another embodiment, a device of transmitting contents through internet includes: a format conversion unit for converting contents stored in a file format into a delivery format; and a packet transmission unit for transmitting the contents converted into the delivery format by using an IP packet, wherein the file format comprises an ftyp box for storing file type information, an mdat box for storing audio or video data, and a moon box for storing information on data stored in the mdat box; and composition information on at least one program constituting the contents is included in one of the mdat box of the file format.

In still further another embodiment, a device of receiving contents through internet includes: a file conversion unit for converting contents received in a delivery format into a file format; and a contents storage unit for storing the contents converted into the file format, wherein the delivery format comprises mdat identification information for identifying an mdat received through an IP packet, and the format conversion unit converts packet streams, which are received through the IP packet, into an mdat of the file format by using the mdat identification information in the delivery format.

Advantageous Effects

According to an embodiment of the present invention, file formats stored in devices for transmitting/receiving contents through the Internet is configured to be compatible with an ISO/IEC 14496-12 ISO Base Media file format in order to be mutually compatible with a delivery format and reduce the overhead according to unnecessary information included.

Additionally, by including program composition information on stream, which is currently transmitted through an IP packet, in the delivery format and reflecting a changed content of the program composition information and version information in real time simultaneously, a conversion between the file format and the delivery format may be easily obtained.

BRIEF DESCRIPTION OF THE DRAWINGS

FIG. 6 is a view of syntax illustrating the architecture of the trak (PSI/SI) of FIG. 5 according to an embodiment of the present invention.

FIG. 8 is a view of syntax illustrating the architecture of supplement data for subtitle.

FIG. 10 is a view of syntax illustrating the architecture of the mdat (PSI/SI) of FIG. 9 according to an embodiment of the present invention.

FIG. 11 is a view illustrating a delivery format of contents according to an embodiment of the present invention.

FIG. 25 is a block diagram illustrating a configuration of an IPTV receiver according to a second embodiment of the present invention.

MODE FOR CARRYING OUT THE INVENTION

Hereinafter, method and device for transmitting/receiving contents will be described in more detail according to an embodiment of the present invention with reference to FIGS. 1 to 25.

Hereinafter, detailed descriptions related to well-known functions or configurations will be ruled out in order not to unnecessarily obscure subject matters of the present invention. Then, terms described later are defined in consideration of the functions of the present invention, but may vary according to the intention or convention of a user or operator. Therefore, its definition will be made based on the overall contents of this specification.

Figure 1:
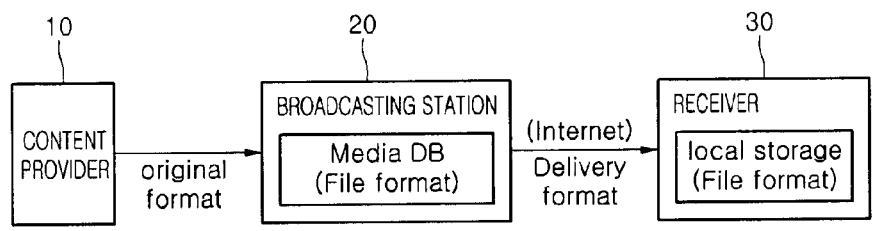
FIG. 1 is a conceptual diagram illustrating an internet based contents transmitting/receiving system according to an embodiment of the present invention

FIG. 1 is a conceptual diagram illustrating an internet based contents transmitting/receiving system according to an embodiment of the present invention.

Referring to FIG. 1, a broadcasting station 20 receives contents from a content provider 10 and stores them in a media DataBase (DB). For example, the contents provided from the content provider 10 may have different formats (original format) according to the types of corresponding contents or content providers providing them, and the broadcasting station 20 may convert the formats of the contents provided from the content provider 10 into a file format, a format to be easily stored, and then, may store them in the media DB.

Moreover, the broadcasting station 20 converts the contents of the file format stored in the media DB into a delivery format, a format to be easily transmitted, and then, transmits them through a network such as internet.

Additionally, a receiver 30 receives or plays the contents of a delivery format transmitted from the broadcasting station 20, or converts the delivery format in order to store it in a local storage.

In this case, the broadcasting station 20 may store the contents provided from the content provider 10 in the media DB with an original format or streaming format (for example, MPEG2 TS).

However, in relation to the contents of the original format, it may take a lot of time to convert them into a streaming format for transmission, and in relation to the streaming format, unnecessary information may be included so that DB storage capacity needs to be increased to store it.

Moreover, the format of the contents stored in the receiver 30 may vary according to a corresponding receiver or a local storage equipped therein, so that the contents may not be used in various devices.

According to an embodiment of the present invention, the internet based contents transmitting/receiving system reduces overhead according to unnecessary information included and provides a delivery format and file format easy for mutual conversion.

The delivery format may have an advantageous structure in an environment where transmission is easy via a network such as internet, for example, there are relatively large errors, and may be designated as a wire format.

Moreover, the delivery format is designed for easy transmission of contents through a network such as internet, but is not limited thereto, and thus may be used for storing the contents.

Additionally, the file format may have an advantageous structure in an environment where contents are be easily stored in a local DB or storage medium, for example, there are relatively small errors, and may be designated as a wireless format.

The file format is designed to be easily store contents, but is not limited to being used for the storage of the contents, and thus may be used for contents transmission.

Figure 2:
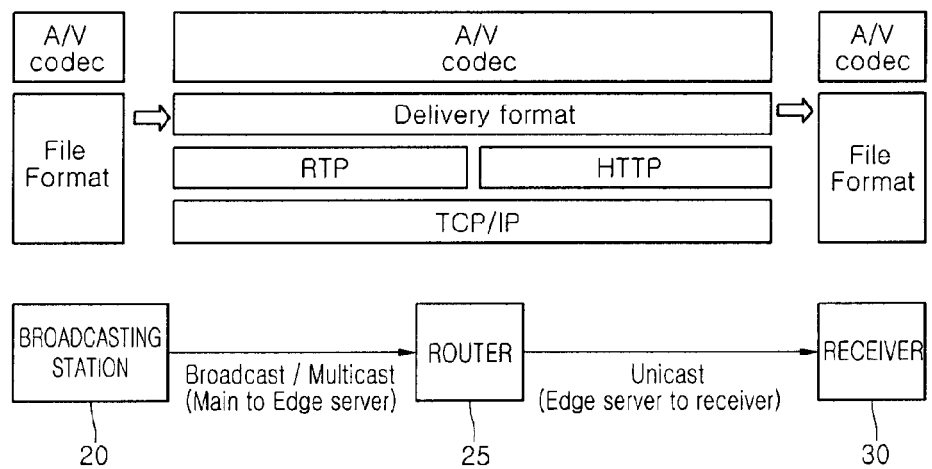
FIG. 2 is a view illustrating a data flow in a transmission/reception system of FIG. 1.

FIG. 2 is a view illustrating a data flow in a transmission/reception system of FIG. 1. The data flow is shown in terms of protocol stack.

The protocol stack is core software implementing a corresponding communication protocol when communication is provided between each device, as a group of software modules implementing communication protocols necessary when different devices data-communicate with each other. A profile prescribes a communication protocol used in an application in order to obtain interconnectivity.

Referring to FIG. 2, when the broadcasting station 20 transmits contents through internet, a transfer protocol may be changed as the transmitted contents pass through a router 25. For example, the contents may be transmitted from the broadcasting station 20 to the router 25 in a Real-time Transport Protocol (RTP) and from the rougher 25 to the receiver 30 in a HyperText Transfer Protocol (HTTP).

However, when seen from a media delivery layer, the contents are transmitted in a regardless of a protocol used in a consistent transfer format regardless of a protocol used in the router 25, and thus, in terms of a transceiver device, the burden of a transmission terminal may be reduced.

Accordingly, the delivery format according to an embodiment of the present invention is designed to have protocol-transparent characteristics, as mentioned above, and the file format may be designed to have the protocol-transparent characteristics in order for easy conversion of the delivery format.

Referring to FIGS. 1 and 2, the broadcasting station 20 may be one example representing a function of a contents transmitting device according to an embodiment of the present invention, and the receiver 30 may be one example representing a function of a contents receiving device according to an embodiment of the present invention.

Moreover, the service provider 10 and the broadcasting station 20 are separated in FIG. 1, but different from that, may be integrated into one to provide contents to the receiver 30 through internet.

Figure 3:
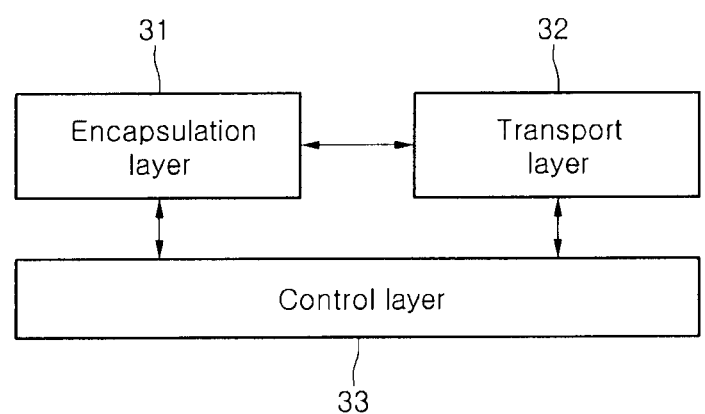
FIG. 3 is a block diagram illustrating a configuration of transmission/reception system according to an embodiment of the present invention.

FIG. 3 is a block diagram illustrating a simple configuration of a transceiver system according to an embodiment of the present invention.

Referring to FIG. 3, the architecture of a media transmission system for transmitting/receiving contents through a network such as internet may include an encapsulation layer 31, a transport layer 32, and a control layer 33.

The encapsulation layer 31 may generate data corresponding to contents that a service provider is to provide and information thereon by using assets including a video, an image, an audio, web contents, or application.

For example, the encapsulation layer 31 may encapsulate the above-mentioned one or more of assets and information thereon as an item for transmission, and then, may deliver it to the transport layer 32.

Moreover, the transport layer 32 may transmit the item delivered from the encapsulation layer 31 and the data delivered from the control layer 33.

Additionally, the control layer 33 may control an operation of the encapsulation layer 31 and the control layer 33 in order to transmit the assets and item.

In the encapsulation layer 31 described with reference to FIG. 3, the assets including a video, an image, an audio, web contents, or application may have a file format according to an embodiment of the present invention, and the item encapsulated for transmission may have a delivery format according to an embodiment of the present invention.

Hereinafter, referring to FIGS. 4 to 10, the configuration of a contents file format according to an embodiment of the present invention will be described in detail.

Figure 4:
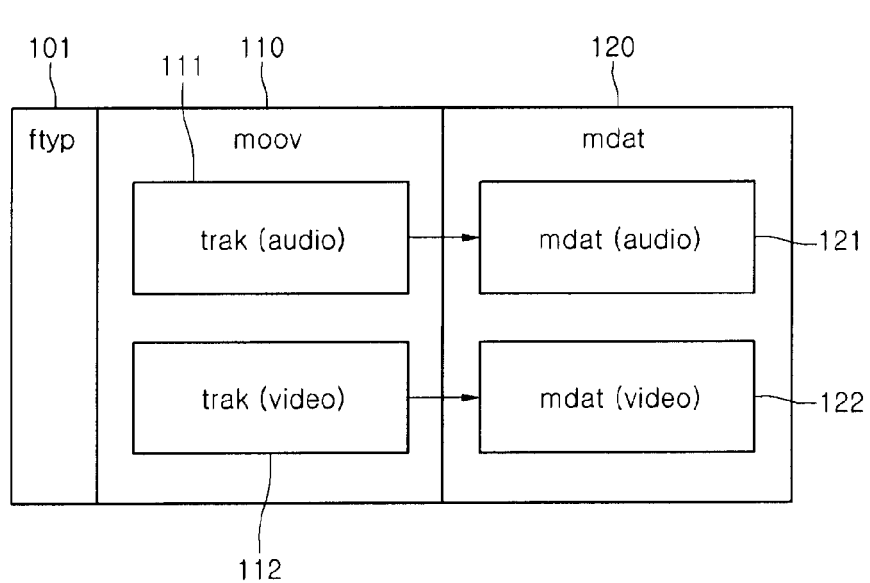
FIG. 4 is a view illustrating a file format of contents.

FIG. 4 is a view illustrating a file format of contents, i.e. an ISO/IEC 14496-12 ISO Base Media file format.

Referring to FIG. 4, a file format 100 used for storing contents may include a ftyp) box 101 for storing type information on a file, an mdat box 120 for storing audio data and video data, and a moon box 110 for storing detail information for playing audio data and video data.

In more detail, a trak(audio) 111 included in the move box 110 may include metadata representing information on the audio data (that is, data stored in the mdat(audio) 121) included in the mdat box 120.

Additionally, a trak(video) 112 included in the move box 112 may include metadata representing information on the video data (that is, data stored in the mdat(video) 122) included in the mdat box 120.

For example, the trak(audio) 111 and the trak(video) 112 may represent unique information on corresponding mdat such as codec, the position and size of data, or data sample size and position, with respect to the data stored in each corresponding mdat.

Moreover, the audio data and the video data included in the mdat box 120 may be data obtained using various compression methods, and for example, the video data stored in the mdat(video) 122 may be data compressed according to the methods such as MPEG-2 Video, H.26x, VC1, Motion JPEG, MPEG-4 Visual, MPEG-4 Part 10 Advanced Video Coding (or H.264), or MPEG-4 Scalable Video Coding.

The file format according to an embodiment of the present invention may be configured to have a compatibility with the above-mentioned ISO/IEC 14496-12 ISO Base Media file format, and may include composition information on a program configured using the data stored in the mdat box 120, in the moove box 110 or the mdat box 120.

The program composition information represents how to constitute data such as audio or video in a corresponding program, and hereinafter, will be designated as 'PSI/SI information'.

The PSI/SI information may include Program Specific Information (PSI) and Service Information (SI) on a corresponding program.

For example, the PSI refers to information that a receiver demultiplexes a specific stream in a multiplexed stream and decodes it, and the SI refers to guide information on a service and an individual program to be provided to a user in addition to the PSI.

In more detail, the PSI may include a Program Association Table (PAT), a Program Map Table (PMT) or a Conditional Access Table (CAT), and the SI may include a Service Description Table (SDT), a Network Information Table (NIT), an Event Information Table (EIT), or a Time Offset Table (TOT).

However, PSI/SI information according to an embodiment of the present invention is not limited to the above PSI/SI, and thus, may include various information necessary for constituting and playing a specific program by using audio or video data.

Figure 5:
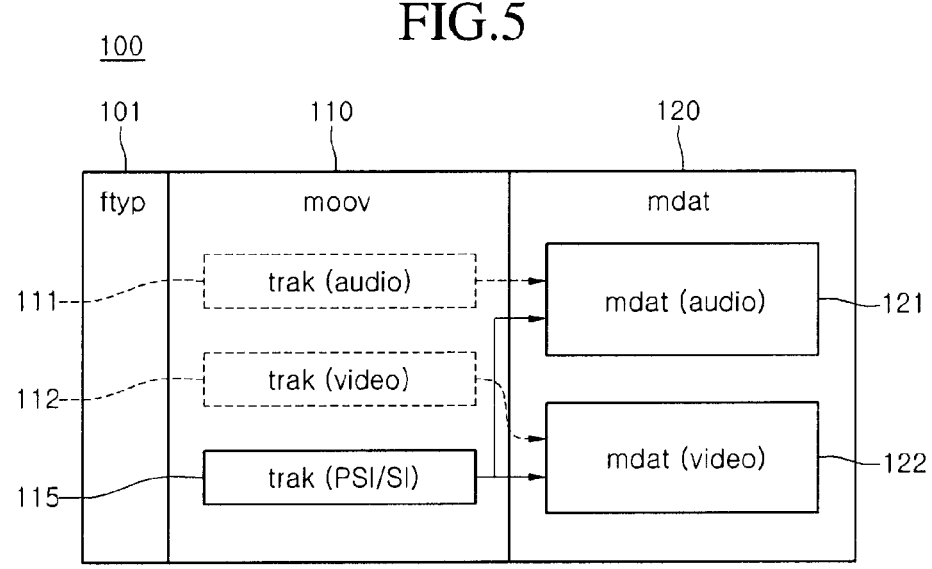
FIG. 5 is a block diagram illustrating a file format of contents according to a first embodiment of the present invention.

FIG. 5 is a view illustrating a contents file format according to a first embodiment of the present invention, and description for the components in the file format of FIG. 5 identical to those described with reference to FIG. 4 will be omitted hereinafter.

Referring to FIG. 5, in relation to the file format according to an embodiment of the present invention, a trak(PSI/SI) 115 representing PSI/SI information on a program constituted using the audio and video data stored in the mdat box 120 may be included in the moon box 110.

For example, the trak(PSI/SI) 115 may include identification information, type information, priority information, information on a configuration change during playback, and supplement information, with respect to each of at least one mdat constituting a corresponding program.

Moreover, when the file format includes a plurality of programs, the trak(PSI/SI) 115 may be in plurality in correspondence to each of the programs.

In this case, the moon box 110 may include a trak(audio) 111 and a trak(video) 112 in order to represent unique information on each of the mdat(audio) 121 and the mdat(video) 122.

Or, unique information such as codec on audio data and video data included in the trak(audio) 111 and the trak(video) 112 may be signaled from the trak(PSI/SI)(115) as supplement information.

As mentioned above, since the trak(PSI/SI)(115) signals PSI/SI information on a program and audio and video related information simultaneously, the conversion from the file format to a delivery format may become easy.

Hereinafter, referring to FIG. 6, the configuration of the trak (PSI/SI) will be described according to an embodiment of the present invention.

Referring to the syntax shown in FIG. 6, the trak (PSI/SI) may include a program_number field, a number_of_mdat field, an mdat_id field, an mdat_type field, a priority field, a start_time field, a duration field, a supplement_length field, and a supplement_data field.

The program_number field may represent program identification information, for example, an unique number, which signals PSI/SI information by the trak (PSI/SI).

For example, if there are a plurality of programs in the file format having the structure shown in FIG. 5, trak(PSI/SI) as much as the number of programs may be included in the moon box, and the programs may be distinguished from each other by using a value of the program_number field.

Moreover, as mentioned above, the file format according to an embodiment of the present invention was described with the example using program_number in order to identify a program, but besides the program_number, various formats of an identifier may be assigned to each program.

The number_of_mdat field may represent the number of mdats constituting a corresponding program. For example, when the program includes an mdat(audio) having audio data and an mdat(video) having video data, the number_of_mdat field may have the value of '2'.

Moreover, the mdat_id field may represent the unique id of a corresponding mdat as an identifier for identifying the mdat constituting a corresponding program.

The mdat_type field represents a type of an mdat constituting a corresponding program, and for example, according to the type of data in the mdat, '1' represents video, '2' represents audio, and '0' is a reserved value for another type.

The priority field represents a priority of a corresponding mdat, and may be a flag that represents whether data in a corresponding mdat are played by default.

Moreover, the priority field may designate one main mdat to each type of the mdat. Also, a value of the priority field may be set, for example, the main mdat of each type is set to '0' and a sub mdat is set to '1'.

For example, when there are two mats corresponding to an audio type among the mdats constituting a corresponding program, among the two audio type mdats, an mdat having the priority field value of '0' is played by default during playback of the program, and an mdat having the priority field value of '1' is selectively played according to a user's selection or a specific playback environment.

Moreover, if there is only one mdat corresponding to a specific mdat type among mdats constituting a corresponding program, the priority field to the mdat has the value of '0'.

Moreover, a section that a corresponding mdat is used may be designated by the start_time field and the duration field.

The start_time field represents the start time of a section that a corresponding mdat is used, and for example, when a corresponding mdat is used from the beginning of the program, the start_time field may have the value of '0'.

The duration field represents the length of a section that a corresponding mdat is used, and when it has the value of '0xFF', it indicates that the corresponding mdat does not change and is used throughout the entire program.

Moreover, values of the start_time field and the duration field may be set by a msec unit, but are not limited thereto, and for example, when a bitrate of data included in a corresponding mdat is set, the values may be designated using a frame number.

The above start_time field and duration field is used as configuration change information (that is, information on an item that a program configuration is changed during its playback, and this may represent time information on an mdat added or changed during program playback when multi-audio or multi-view is supported or an audio/video mdat constituting a program is changed.

For example, from the start of a program that PSI/SI information is signaled by the trak (PSI/SI), an audio type main mdat changes from the mdat of 'id1' into the mdat of 'id2' at the time after 180 msec, and when the mdat of 'id2' is used for 130 msec, the start_time field value is set to '0' and the duration field value is set to '180' with respect to the mdat of 'id1', and the start_time field value is set to '180' and the duration field value is set to '130' with respect to the mdat of 'id2'.

Additionally, as mentioned above, as a configuration changes during program playback, when the file format shown in FIG. 5 is converted into a delivery format, the version of PSI/SI signaling information may be updated according to the start_time field value and the duration field value.

Moreover, the start_time field and the duration field are just one embodiment representing configuration change information on a program, and the present invention is not limited thereto. The configuration change information may be expressed in various formats in order to represent a section that an mdat is used on the time axis.

For example, the duration field may be replaced with an end_time field that represents a time at which a usage of a corresponding mdat ends, and in this case, the duration field value may be calculated by a difference between the end_time field value and the start_time field value.

The supplement_length field may designate the length of supplement information when there is the supplement information on a corresponding mdat.

Additionally, the supplement_data field represents supplement information on a corresponding mdat, and for example, as described with reference to FIG. 5, when the trak (PSI/SI) includes unique information such as codec on audio/video data included in an mdat(audio) and an mdat(video), the unique information on the audio/video data may be included in the supplement_data field.

Figure 7:
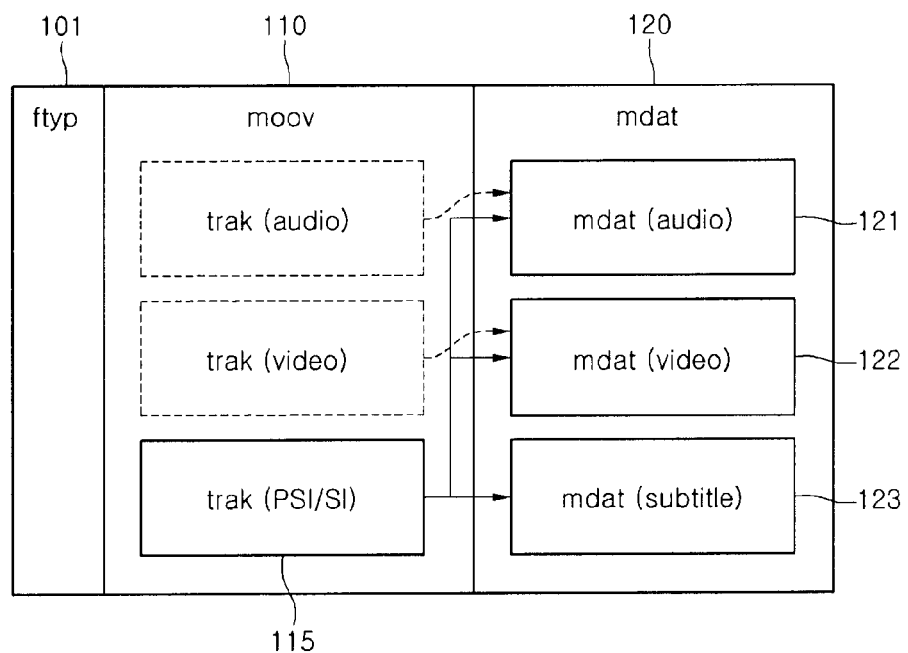
FIG. 7 is a view when an mdat for subtitle is added in the file format of FIG. 5.

Referring to FIG. 7, the mdat box 120 of the file format 100 may further include an mdat(subtitle) 123 for storing subtitle data.

Furthermore, PSI/SI information related to the mdat(subtitle) 123 may be signaled by the trak (PSI/SI) having the configuration described with reference to FIG. 6, and in this case, the mdat_type field value to the mdat(subtitle) 123 may be designated to '3'.

Since a method of signaling PSI/SI information related to the mdat(subtitle) 123 by using the trak (PSI/SI) may be identical to that described with reference to FIG. 6, its detailed description will be omitted.

The supplement_data field of the trak (PSI/SI) may include unique information on subtitle data in the mdat(subtitle) 123, for example, language in use, a subtitle type, and configuration page information, as supplement information.

FIG. 8 is a view illustrating the configuration of supplement data for a subtitle in syntax according to an embodiment of the present invention, and when the mdat_type field value is '3' in the trak (PSI/SI) shown in FIG. 6 is it represents the subtitle related supplement information designated by the supplement_data field.

Referring to FIG. 8, since the supplement_data field including subtitle related supplement information uses total 8 bytes, the supplement_data field value may be designated to '8'.

An ISO_639_language_code field represents a language used in a subtitle, and for this, may have a language code defined in ISO 639-2, as a field value. For example, when ISO_639_language_code field value is 'kor', the language used in a subtitle is Korean language, and when it is 'eng', the language used in a subtitle is English.

Moreover, a subtitling_type field represents a subtitle type, and for example, a field value of '0' may represent a general type, '1' may represent a Vertical Blanking Interval (VBI) type, and '2' may represent a type for the hearing impaired.

An aspect_ratio field represents that a subtitle is configured to be fit for what format of a display. That is, when the field value is '1', a corresponding subtitle is configured to fit for a display having a 4:3 aspect ratio display, when the field value is '2', a corresponding subtitle is configured to fit for a display having a 16:9 aspect ratio display, and when the field value is '3', a corresponding subtitle is configured to fit for a display having a 2.35:1 aspect ratio display. That is, when the field value is '0', a corresponding subtitle is configured regardless of a display.

Additionally, a composition_page_id field represents an id for identifying each page constituting a corresponding subtitle, and an ancillary_page_id field represents an id for indentifying an auxiliary pate among pages constituting a corresponding subtitle.

As described with reference to FIGS. 7 and 8, according to a structure of an mdat(subtitle), it is possible to use an existing subtitle stream as it is.

Figure 9:
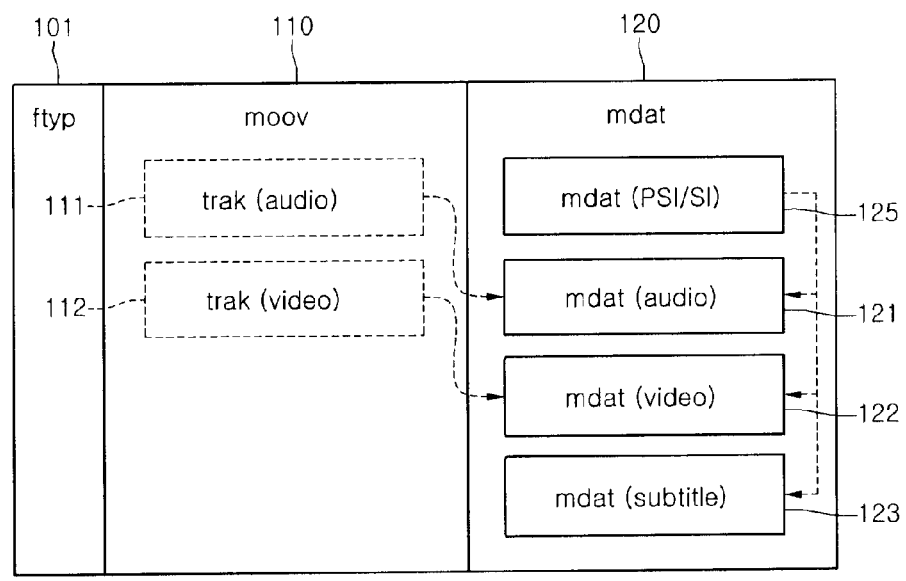
FIG. 9 is a view illustrating a file format of contents according to a second embodiment of the present invention.

FIG. 9 is a view illustrating a contents file format according to a second embodiment of the present invention, and description for the components in the file format of FIG. 9 identical to those described with reference to FIGS. 4 to 8 will be omitted hereinafter.

Referring to FIG. 9, in relation to the file format according to a second embodiment of the present invention, an mdat (PSI/SI) 125 for storing PSI/Si related data on a program may be included in an mdat box 120.

That is, in the case of the file format according to the first embodiment of the present invention as described with reference to FIGS. 5 to 8, PSI/SI information on a program is included in the trak(PSI/SI) 115 in the moon box 110, but in the case of the file format according to the second embodiment of the present invention, the PSI/SI information may be included in the mdat(PSI/SI) 125 in the mdat box 120.

Since the configuration of the PSI/SI information in the mdat(PSI/SI) 125 is similar to the configuration of the PSI/SI information included in the trak(PSI/SI) 115 as described with reference to FIGS. 5 to 8, hereinafter, only a different component from the task(PSI/SI) 115 among the configuration of the mdat(PSI/SI) 125 will be mainly described.

The mdat(PSI/SI) 125 may include identification information on each of at least one mdat constituting a corresponding program, type information, priority information, and supplement information, in addition to identification information and version information on PSI/SI information, with respect to a program included in the file format 100.

Moreover, when the file format 100 includes a plurality of programs, one mdat(PSI/SI) 125 may include all PSI/SI information on the plurality of programs.

By including PSI/SI information on at least one program in the file format 100 in the mdat(PSI/SI) 125, the size of PSI/SI related data stored in the mdat box 120 may be increased, but conversion to a delivery format may become easier.

Additionally, the moon box 110 includes the trak(audio) 111 and the trak(video) 112 in order to represent unique information on each of the mdat(audio) 121 and the mdat (video) 122.

Or, unique information such as codec on audio data and video data included in the trak(audio) 111 and the trak(video) 112 may be signaled from the mdat(PSI/SI) 125 as supplement information.

As mentioned above, since the mdat(PSI/SI) 125 signals PSI/SI information on a program and audio and video related information simultaneously, the conversion from the file format to a delivery format may become easy.

Hereinafter, referring to FIG. 10, the configuration of the mdat (PSI/SI) will be described according to an embodiment of the present invention.

Referring to the syntax shown in FIG. 10, the mdat(PSI/SI) may include a PSI/SI_info_id field, a version field, a number_of_programs field, a program_number field, a number_of_mdat field, an mdat_id field, an mdat_type field, a priority field, a supplement_length field, and a supplement_data field.

The PSI/SI_info_id field represents an id for identifying the type of corresponding PSI/SI information, and for example, information a corresponding Program Map Table (PMT) and Program Association Table (PAT) defined in MPEG-2 TS may have the field value of '0'.

Moreover, when PSI/SI information necessary besides the PMT and PAT is additionally configured, an id for identifying the type of corresponding PSI/SI information is numbered, and then, is added as the PSI/SI_info_id field value.

The version field value is updated when corresponding PSI/SI information is changed. For example, when the number of mdats constituting a corresponding program is increased or reduced or the configuration of an entire program is changed during program playback, the version field value may be updated.

Additionally, when the program composition information is changed, the version information is updated and a changed content of the program composition information may be reflected on the mdat(PSI/SI) in real time simultaneously.

In this case, since the changed content of the PSI/SI information is already reflected on the mdat(PSI/SI), like the file format according to the first embodiment of the present invention as described with reference to FIGS. 5 to 8, usage section information on each mdat does not need to be represented additionally by using the start_time field and the duration field.

Moreover, the number_of_programs field may represent the number of programs in the file format 100, and the program_number field may represent an unique number for identifying each program.

For example, if there are a plurality of programs in the file format 100 having the structure shown in FIG. 9, there are loops as much as the number of the programs in the mdat(PSI/SI), and the programs may be separated from each other by using the program_number field value.

The number_of_mdat field may represent the number of mdats constituting a corresponding program, and the mdat_id field may represent an unique id for identifying an mdat constituting a corresponding program.

Moreover, the mdat_type field may represent the type of an mdat constituting a corresponding program, and the priority field may represent the priority of a corresponding mdat.

Furthermore, the supplement_length field may designate the length of supplement information when there is the supplement information on a corresponding mdat, and the supplement_data field may represent supplement information on a corresponding mdat.

For example, the supplement_data field of the mdat (PSI/SI) may include unique information on subtitle data in the mdat(subtitle) 123, for example, language in use, a subtitle type, and configuration page information, as supplement information.

Hereinafter, referring to FIG. 11, the configuration of a contents delivery format according to an embodiment of the present invention will be described in detail.

Referring to FIG. 11, when contents are transmitted through internet, since the delivery format in an IP packet, additional address and fragmentation therefore may not be necessary.

Moreover, since the IP packet has a variable length, a delivery format according to an embodiment of the present invention may be configured to support the variable length.

For example, mdats included in the file format 100 described with reference to FIGS. 4 to 10 are cut according to a time window having a predetermined size, and is converted into a delivery format, and the converted delivery format is included in an IP packet, and then, is sequentially transmitted.

Referring to the syntax shown in FIG. 11, the delivery format may be configured including an mdat_id field, a clock_reference_indicator field, a data_length field, a PCR_base/PCR_extension field, a number_of_mdat field, an mdat_id field, an mdat_type field, a priority field, and a payload_data_byte field.

The mdat_id field may represent an unique id for identifying an mdat included in a delivery format, and the configuration of an id designated by the mdat_id field value may be signaled by the PSI/SI information described with reference to FIGS. 5 to 10.

That is, the mdat_id field may designate an unique id for identifying an mdat included in the delivery format according to the unique id that the PSI/SI information in the file format 100 assigns to each mdat. This functions similar to the PID (Packet ID) defined in MPEG2 TS.

Moreover, when the PSI/SI information is included in a delivery format, the mdat_id field of a corresponding delivery format may have a value separately designated with refer to the PSI/SI information, for example, '0'.

The clock_reference_indicator field may represent whether a Program Clock Reference (PCR) is transmitted to an IP packet including a corresponding delivery format, and the PCR_base/PCR_extension field may represent a clock reference value.

For example, when the clock_reference_indicator field value is '1', the PCR is transmitted through a corresponding IP packet, and the transmitted PCR may have a clock reference value designated by the PCR_base/PCR_extension field.

On the contrary, when the clock_reference_indicator field value is '0', it is represented that the PCR is not transmitted through a corresponding IP packet.

The PCR is a value that is included in a delivery format in order to set the STC at the reception side to an intended value at the transmission side, as a total 42 bit time reference value for setting or compensating for a value of System Time Clock (STC).

The total 42 bit PCR is divided into a 33 bit PCR_base area and a 9 bit PCR_extension area. The PCR_base may use 1/300 of a system clock frequency (for example, 90 kHz) as a unit and the PCR_extension may use a system clock frequency (for example, 27 kHz) as a unit.

For example, when the clock_reference_indicator field value of a delivery format in an IP packet received from the transmission side is '1', the reception side may calculate the PCR according to the PCR_base field value and the PCR_extension field value through the following Equation 1.

$$PCR=PCR\_base \times 300 + PCR\_extension \qquad \text{Equation 1}$$

Moreover, the data_length field may represent the length of data included in a corresponding data unit.

The payload_data_byte field is an area where actual data stored in each mdat are transmitted, and for example, each of audio, video, subtitle data corresponding to mdats 121, 122, 123, and 125 cut according to the time window, or PSI/SI related data may be transmitted by a byte unit through the payload_data_byte field.

Additionally, the PSI/SI information stored in the trak(PSI/SI) 115 may be transmitted at each predetermined period through the payload_data_byte field.

The delivery format described with reference to FIG. 11 may be included the payload of an IP packet according to a protocol such as User Datagram Protocol (UDP), Transmission Control Protocol (TCP), RTP or HTTP, and accordingly, since an additional parameter for transmission is not required, overhead unnecessary for transmitting contents through internet may be reduced.

Moreover, the configuration of the PSI/SI information transmitted using the above-mentioned delivery format may be identical to that of the mdat(PSI/SI) among the file formats according to the second embodiment of the present invention as described with reference to FIG. 10.

Accordingly, a configuration of PSI/SI information transmitted in a delivery format according to an embodiment of the present invention will be briefly described with reference to FIG. 10.

Referring to FIG. 10 again, the PSI/SI_info_id field of the PSI/SI information included in a delivery format may represent an id for identifying the type of corresponding PSI/SI information, and a version field value may be updated when corresponding PSI/SI information is changed.

For example, when the number of mdats constituting a program is increased or reduced while contents are transmitted through an IP network or the configuration of an entire program is changed, the version field value may be updated.

However, since a change of the PSI/SI information in the delivery format is signaled in real time, like the file format according to the first embodiment of the present invention as described with reference to FIGS. 5 to 8, usage section information on each mdat does not need to be represented additionally by using the start_time field and the duration field.

The number_of_programs field of the PSI/SI information in the delivery format may represent the number of programs transmitted to a corresponding delivery format, and the program_number field may represent an unique number for identifying each program.

Moreover, the number_of_mdat field may represent the number of mdats constituting a corresponding program, and the mdat_id field may represent an unique id for identifying an mdat constituting a corresponding program.

Additionally, the mdat_type field of the PSI/SI information in the delivery format may represent the type of an mdat constituting a corresponding program, and the priority field may represent the priority of a corresponding mdat.

Furthermore, the supplement_length field may designate the length of supplement information when there is the supplement information on a corresponding mdat, and the supplement_data field may represent supplement information on a corresponding mdat.

The PSI/SI information included in a delivery format and transmitted may include composition information on stream, which is currently in transmission by using an IP packet, and also since the PSI/SI information has a configuration compatible with that of the file format 100 as described with reference to FIGS. 4 to 10, mutual conversion may be easy.

A contents transmitting method according to an embodiment of the present invention includes converting contents stored in a file format into a delivery format; and transmitting the contents converted into the delivery format by using an IP packet.

Additionally, a contents receiving method according to an embodiment of the present invention includes converting contents received in a delivery format into a file format; and storing the contents converted into the file format.

Moreover, in the contents transmitting/receiving method, the file format may have the structure described with referent to FIGS. 4 to 10, and the transmission format may have the structure described with reference to FIG. 12.

Hereinafter, referring to FIGS. 12 to 23, a conversion method between a file format and a delivery format according to an embodiment of the present invention and configurations of a transmission device and a reception device using the same will be described.

Figure 12:
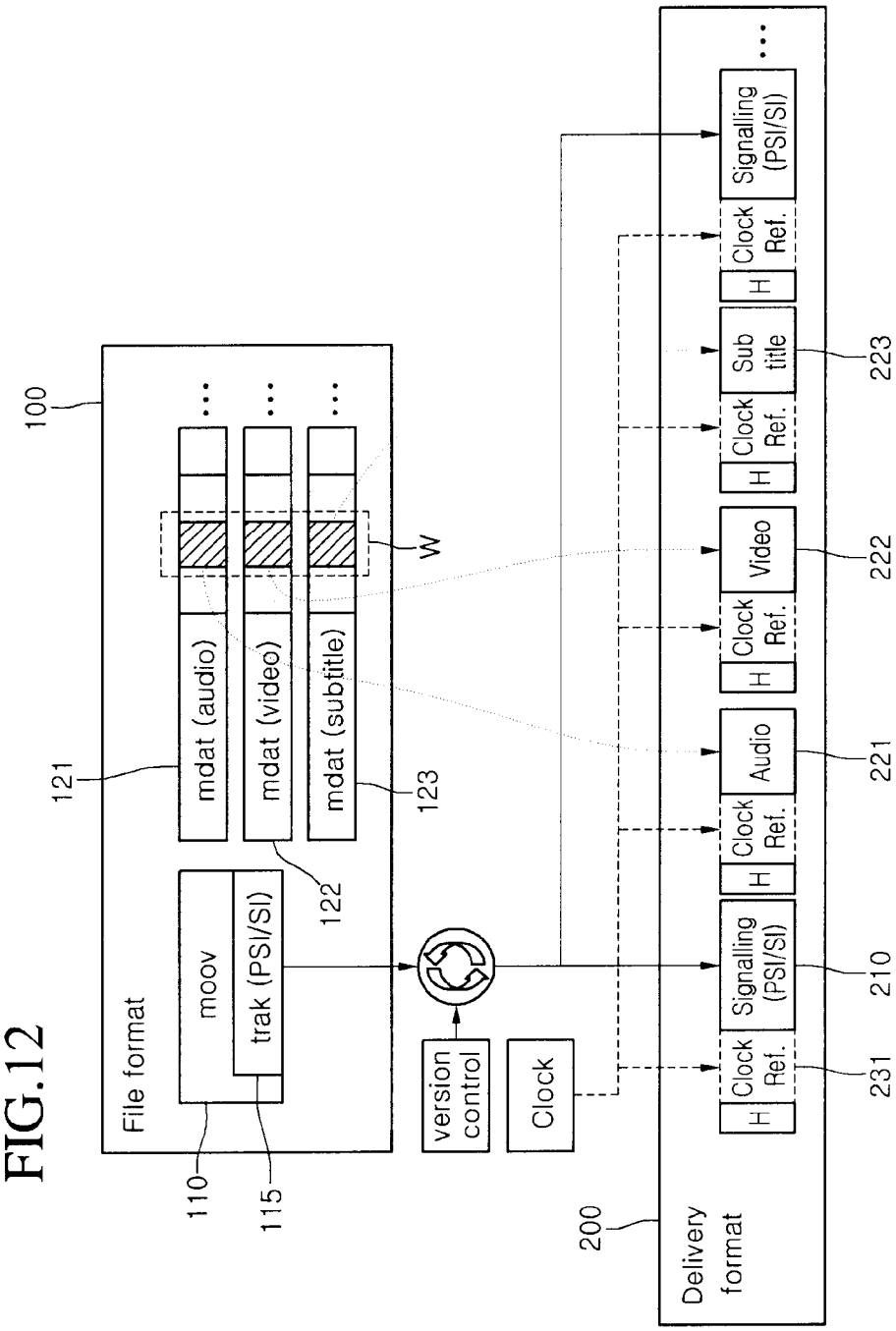
FIGS. 12 and 13 are views illustrating a method of converting a file format of contents into a delivery format.
Figure 13:
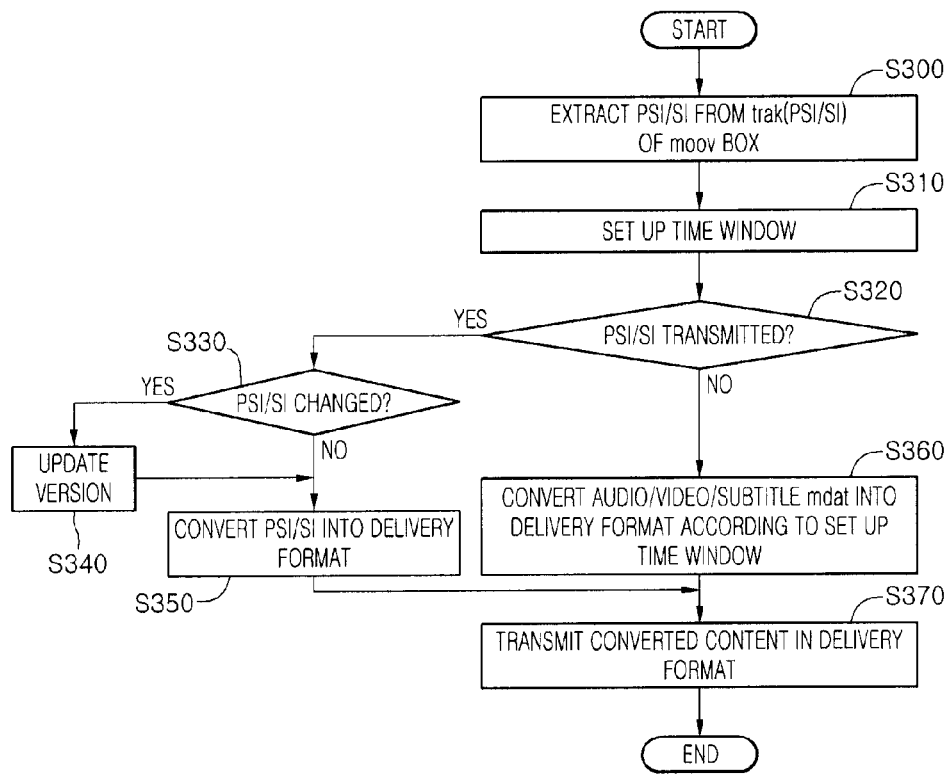

FIGS. 12 and 13 are views illustrating a method of converting a file format into a delivery format, and that is, a method of converting contents stored in a file format according to the first embodiment of the present invention as described with reference to FIGS. 5 to 8 into a delivery format according to an embodiment of the present invention as described with reference to FIG. 11 will be described.

Referring to FIG. 12, when contents are stored in a server of a service provider with the above-mentioned file format 100, the service provider converts the contents stored in the file format 100 into the delivery format 200 in order to transmit the contents.

In this case, the PSI/SI information of the trak(PSI/SI) 115 included in the moon box 110 of the file format 100 may be converted into the PSI/SI signaling information 210, and may be transmitted at each predetermined period.

Moreover, since the configuration of the PSI/SI signaling information 210 in the delivery format 200 is identical to that described with reference to FIG. 10, its detailed description will be omitted.

In the PSI/SI information stored in the trak(PSI/SI) 115, according to the configuration change information of the start time/duration field described with reference to FIG. 6, after its version is updated and its changed contents are reflected, the PSI/SI information may be transmitted.

That is, the transmission device (for example, a service provider server) determines whether the PSI/SI information is changed according to the start time/duration field values, and when the PSI/SI information is changed, the changed PSI/SI information is reflected on the PSI/SI signaling information 210 in order to update a version.

Accordingly, even through the reception device (for example, an IPTV receiver) accesses the service provider service at some point, effective PSI/SI information may be received at the current access time.

Moreover, each of an mdat(audio), an mdat(video), and an mdat(subtitle) stored in the file format 100 is cut according to the time window W having a predetermined size, and thus, an audio packet stream 221, a video packet stream 222, and a subtitle packet stream 223 may be sequentially transmitted.

For example, the each mdat is converted into a packet stream transmittable using internet, and the converted packet stream may be identified by the mdat_id field described with reference to FIG. 11.

Additionally, in the case of a corresponding IP packet including PCR, for example, when the clock_reference_indicator field value is '1' in the delivery format 200 as described with reference to FIG. 11, the clock reference value Clock Ref. 231 of the transmission device is inserted into the delivery format 200 and is transmitted.

Each of the PSI/SI signaling information 210, the audio packet stream 221, the video packet stream 222, and the subtitle packet stream 223 may be included in the payload of an IP packet transmitted from the service provider, and for example, they may be included by a byte unit in the payload_data_byte field of the delivery format 200 as described with reference to FIG. 11.

As described with reference to FIG. 12, by converting the trak(PSI/SI) of the file format 100 into a packet on the basis of the compatibility of PSI/SI information and transmitting the packet, the contents stored in the file format 100 may be easily converted into the delivery format 2000 of an IP packet unit.

Figure 14:
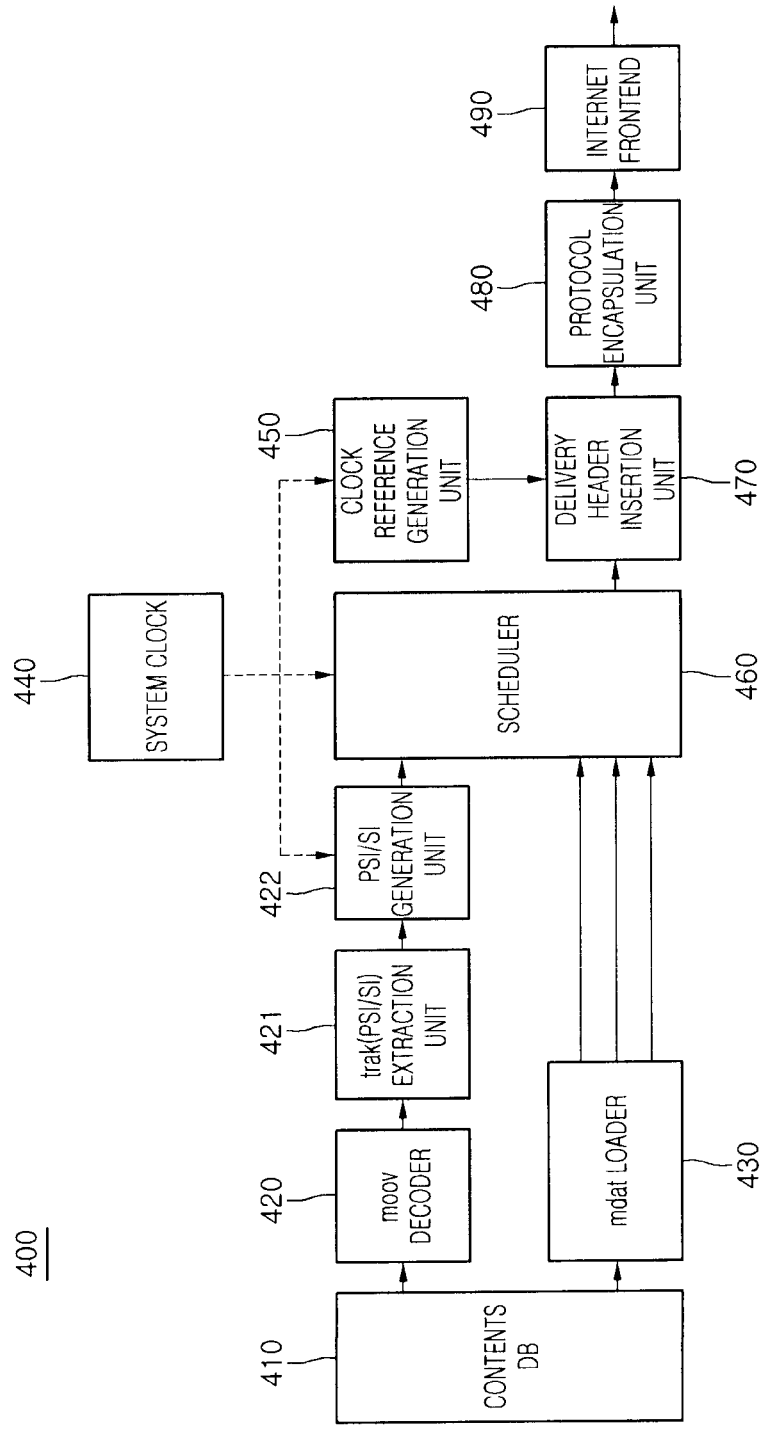
FIG. 14 is a block diagram illustrating a configuration of a contents transmitting device according to a first embodiment of the present invention.

FIG. 13 is a flowchart illustrating a method of converting a file format into a delivery format according to an embodiment of the present invention. FIG. 14 is a block diagram illustrating a configuration of a contents transmitting device according to a first embodiment of the present invention. Hereinafter, the conversion method of FIG. 13 will be described in more detail in linkage with the block diagram shown in FIG. 14.

First, when the configuration of the transmission device shown in FIG. 14 is briefly described, the transmission device 400 may include a contents DB 410, a moon decoder 420, a trak(PSI/SI) extraction unit 421, a PSI/SI generation unit 422, an mdat loader 430, a system clock 440, a clock reference generation unit 450, a scheduler 460, a Delivery header insertion unit 470, a Protocol encapsulation unit 480, and an Internet frontend 490.

Additionally, a contents transmitting device according to an embodiment of the present invention includes a format conversion unit for converting contents stored in a file format into a delivery format; and a packet transmission unit for transmitting the contents converted into the delivery format by using an IP packet.

In this case, the format conversion unit of the contents transmitting device according to an embodiment of the present invention may include the moov decoder 420, the trak(PSI/SI) extraction unit 421, the PSI/SI generation unit 422, the mdat loader 430, and the scheduler 460, shown in FIG. 14, and the packet transmission unit may include the delivery header insertion unit 470, the protocol encapsulation unit 480, and the internet frontend 490

Referring to FIGS. 13 and 14, the transmission device 400 extracts PSI/SI information from the trak(PSI/SI) of the moov box in the stored file format 100 of contents to be transmitted in operation S300.

The contents DB 410 of the transmission device 400 are stored and managed in the file format 100 described with reference to FIGS. 1 to 10, and the moov decoder 420 may extract data of the moov box 110 from the file format 100 stored in the contents DB 410.

Moreover, the trak(PSI/SI) extraction unit 421 may extract trak(PSI/SI) data including program composition information among moov data outputted from the moov decoder 420.

The PSI/SI generation unit 422 may generate the PSI/SI information of the delivery format 200 for streaming by using the extracted trak(PSI/SI) data, and may output the generated PSI/SI information to the schedule 460 in order for repeated transmission at a predetermined period according to a clock provided from the system clock 440.

The mdat loader 430 may load actual contents data included in each of an mdat(audio), an mdat(video), and an mdat(subtitle), that is, audio, video, and subtitle data, and then, may deliver them to the schedule 460.

Then, the transmission device 400 sets up a time window in operation S310, and determines a transmission time of the PSI/SI information in operation S320.

The scheduler 460 of the transmission device 400 may sequentially stream the PSI/SI information inputted from the PSI/SI generation unit 422 and the audio, video, and subtitle data inputted from the mdat loader 430 according to a system clock.

For example, the audio, video, and subtitle data inputted from the mdat loader 430 are cut according to a time window W having a predetermined size, and then, are sequentially transmitted. The time window W may be set by the scheduler 460.

Additionally, the scheduler 460 may determine whether it is a time to transmit the current PSI/SI information inputted from the PSI/SI generation unit 422 on the basis of a transmission period of the PSI/SI information.

When it is a time to transmit the current PSI/SI information, the transmission device 400 confirms whether the PSI/SI information to be transmitted is updated in operation S330, and updates the version of the PSI/SI information in operation S340.

For example, the PSI/SI generation unit 422 may reflect the corresponding changed contents on the PSI/SI signaling information 210 to be included in the delivery format 200 according to a changed time of the PSI/SI information, and may update the version of the PSI/SI signaling information 210.

In more detail, the PSI/SI generation unit 422 may determine whether the PSI/SI information is changed according to the program configuration change information included in the PSI/SI information of the file format 100, and if the PSI/SI information is changed, may update the version of the PSI/SI information to be included in the delivery format 200.

Then, the transmission device 400 converts the PSI/SI information into a delivery format in operation S350, and transmits the contents converted into the delivery format through a network such as internet in operation S370.

Moreover, if it is not a time to transmit the current PSI/SI information, the transmission device 400 converts audio/video/subtitle mdat into a delivery format according to the set up time window in operation S360, and then, transmits the contents converted into the delivery format through a network such as internet in operation S370.

For example, the scheduler 460 may cut the audio, video, and subtitle data inputted from the mdat loader 430 according to the time window set up in operation S310, and may include them in the delivery format 200 as described with reference to FIGS. 11 and 23 in order for sequential output.

The delivery header insertion unit may generate header information and may insert it in the delivery format 200, and the protocol encapsulation unit 480 may encapsulate the delivery format 200 according to a delivery protocol, and then, may output it.

The delivery protocol may include various kinds of protocols such as UDP, TCP, RTP and HTTP used for data transmission through internet.

The internet frontend 490 may transmit corresponding contents through internet by performing physical encoding for internet transmission on the encapsulated delivery format 200.

Moreover, the system clock 440 may provide a basic clock for streaming in the transmission device 400, and also the PSI/SI generation unit 422, the clock reference generation unit 450, and the scheduler 460 may perform operations for contents transmission according to the system clock.

The clock reference generation unit 450 may generate a clock reference value Clock Ref. for synchronization with a reception device by using the clock provided from the system clock 440.

The generated clock reference value Clock Ref. may be selectively inserted into the delivery format 200 as described with reference to FIG. 12.

Moreover, the transmission device 400 may transmit corresponding contents by repeatedly performing operation S300 to S370 shown in FIG. 12 until all mdats constituting contents are transmitted.

Figure 15:
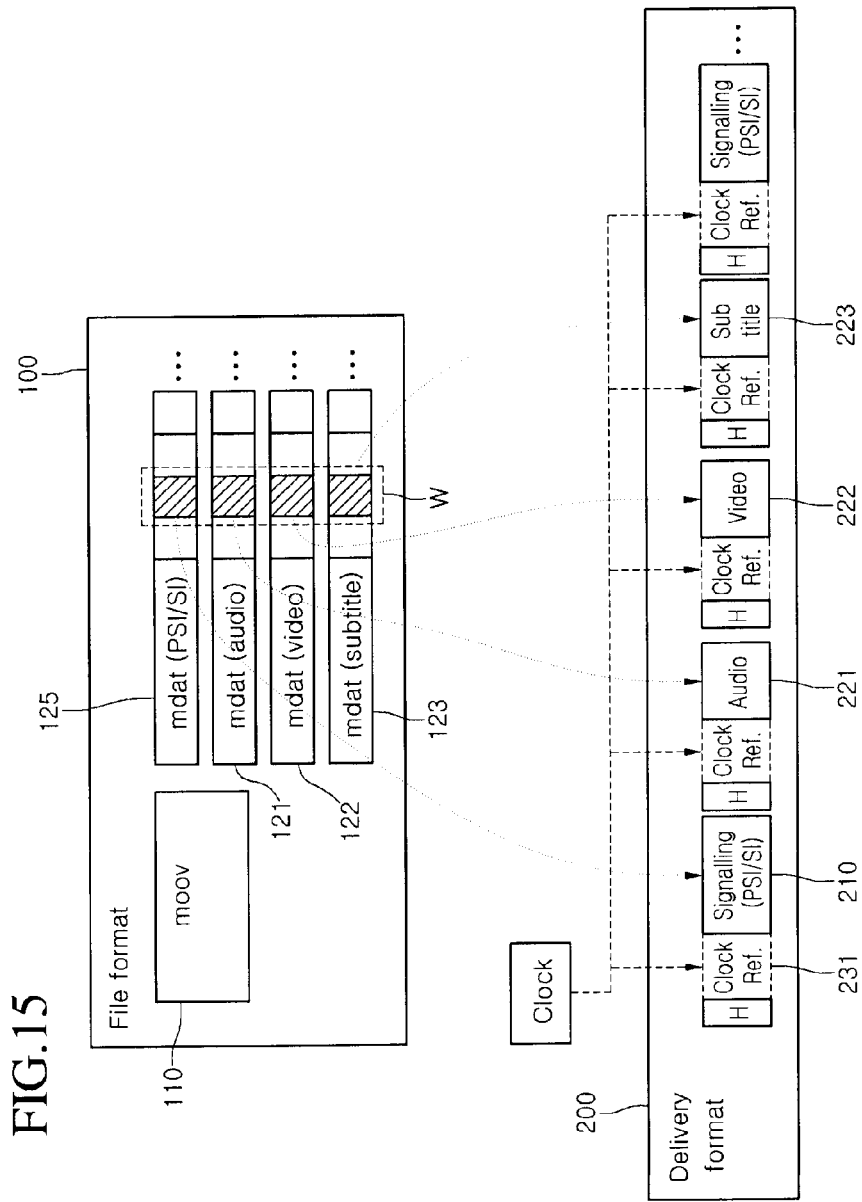
FIGS. 15 and 16 are views illustrating a method of converting a file format of contents into a delivery format according to a first embodiment of the present invention.
Figure 16:
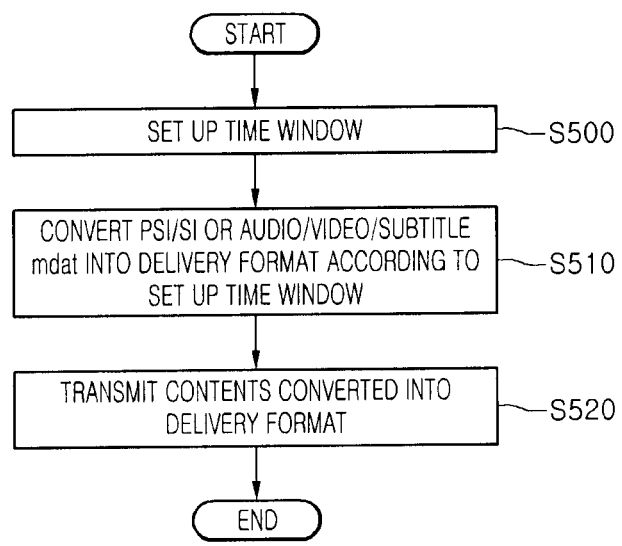

FIGS. 15 and 16 are views illustrating a method of converting a file format into a delivery format, and that is, a method of converting contents stored in a file format according to the second embodiment of the present invention as described with reference to FIGS. 9 to 10 into a delivery format according to an embodiment of the present invention as described with reference to FIG. 11 will be described. Moreover, detailed description for the same contents described with reference to FIGS. 12 and 13 in another embodiment of the conversion method will be omitted hereinafter.

Referring to FIG. 15, when contents are stored in a server of a service provider in the file format 100 as shown in FIG. 9, the PSI/SI information of the mdat(PSI/SI) 125 may be converted into the PSI/SI signaling information 210, and then, may be transmitted at each predetermined period.

Here, since the changed contents of the PSI/SI information are already reflected on the mdat(PSI/SI) 125, the information included in the mdat(PSI/SI) of the file format 100 may be converted into the PSI/SI signaling information 210 of the delivery format 200 as it is, and then may be transmitted.

Moreover, each of an mdat(audio), an mdat(video), and an mdat(subtitle) stored in the file format 100 may be cut according to the time window W having a predetermined size, and thus, PSI/SI signaling information 210, an audio packet stream 221, a video packet stream 222, and a subtitle packet stream 223 may be sequentially transmitted.

The clock reference value Clock Ref. 231 of the transmission device may be selectively inserted into the delivery format 200 and then may be transmitted.

Figure 17:
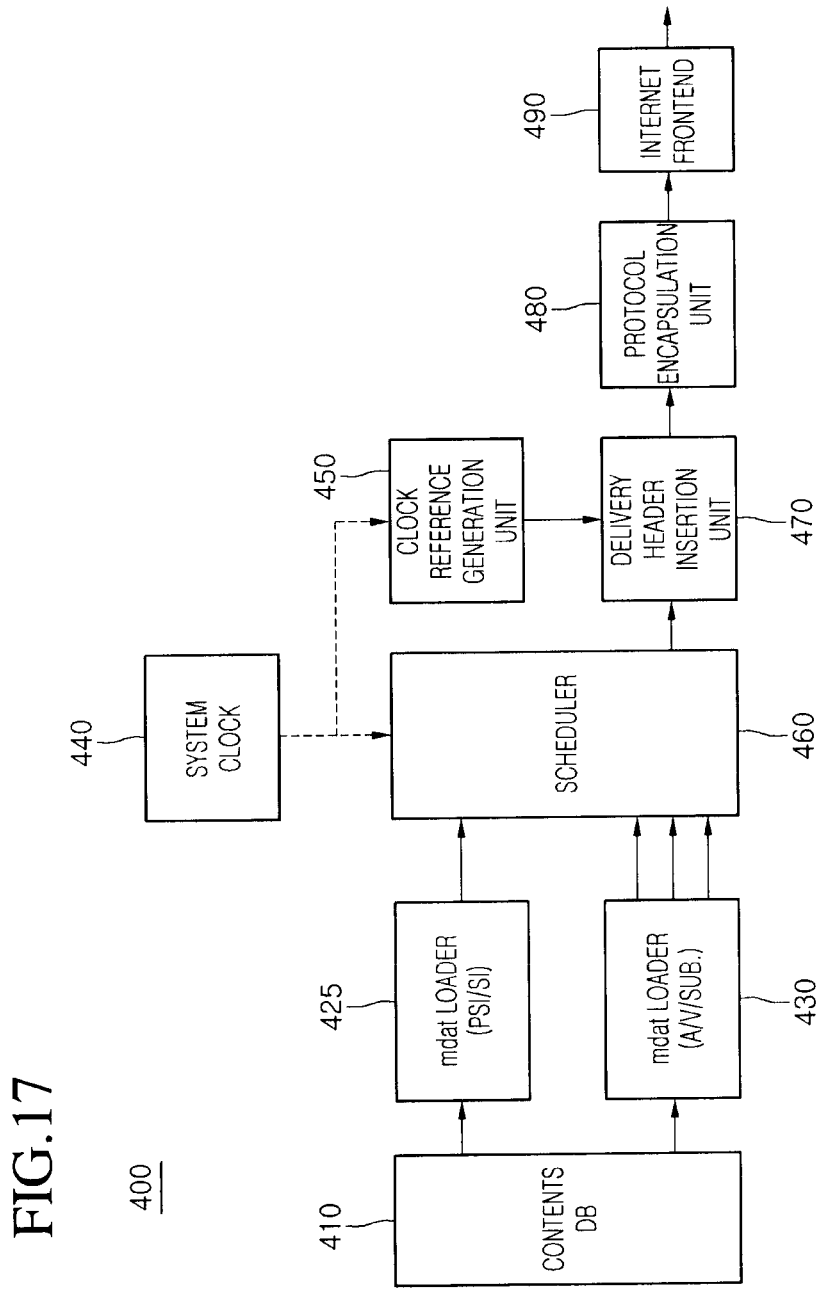
FIG. 17 is a block diagram illustrating a configuration of a contents transmitting device according to a second embodiment of the present invention.

FIG. 16 is a flowchart illustrating a method of converting a file format into a delivery format according to an embodiment of the present invention. FIG. 17 is a block diagram illustrating a configuration of a contents transmitting device according to a second embodiment of the present invention. Hereinafter, the conversion method of FIG. 16 will be described in more detail in linkage with the block diagram shown in FIG. 17. Moreover, detailed description for the same components described with reference to FIG. 13 in the configuration of the transmission device 400 shown in FIG. 17 will be omitted hereinafter.

Moreover, the format conversion unit of the contents transmitting device according to another embodiment of the present invention may include a moov decoder 420, an mdat loader(PSI/SI) 425, an mdat loader(A/V/Sub) 430, and a scheduler 460, shown in FIG. 17, and the packet transmission unit may include a delivery header insertion unit 470, a protocol encapsulation unit 480, and an internet frontend 490.

Referring to FIGS. 16 and 17, the transmission device 400 sets up a time window in operation S500, and converts PSI/SI or audio/video/subtitle mdat into a delivery format according to the set up time window in operation S510.

For example, the mdat loader (PSI/SI) 425 in the transmission device 400 loads the PSI/SI information included in the mdat(PSI/SI) in the file format 100, and delivers it to the scheduler 460, and also, the mdat loader(A/V/Sub.) 430 loads actual contents data included each of an mdat(audio), an mdat(video), and an mdat(subtitle) and then, delivers it to the scheduler 460.

The scheduler 460 may cut the PSI/SI information inputted from the mdat loader(PSI/SI) 425 or the audio, video, and subtitle data inputted from the mdat loader(A/V/Sub.) 430 according to the set up time window, and then, may include the cut each data in the delivery format 200 in order for sequential output.

Moreover, in the case of the file format 100 as shown in FIG. 15, since the PSI/SI information included in the mdat (PSI/SI) is converted into the PSI/SI signaling information of the delivery format 200 as it is, and then is transmitted, the transmission device 400 according to the second embodiment of the present invention may not include the moov decoder 420, the trak(PSI/SI) extraction unit 421, and the PSI/SI generation unit 422 shown in FIG. 14.

Then, the transmission device 400 transmits the contents converted into the delivery format through a network such as internet in operation S520.

Moreover, the transmission device 400 may transmit corresponding contents by repeatedly performing operation S500 to S3520 shown in FIG. 16 until all mdats constituting contents are transmitted.

Figure 18:
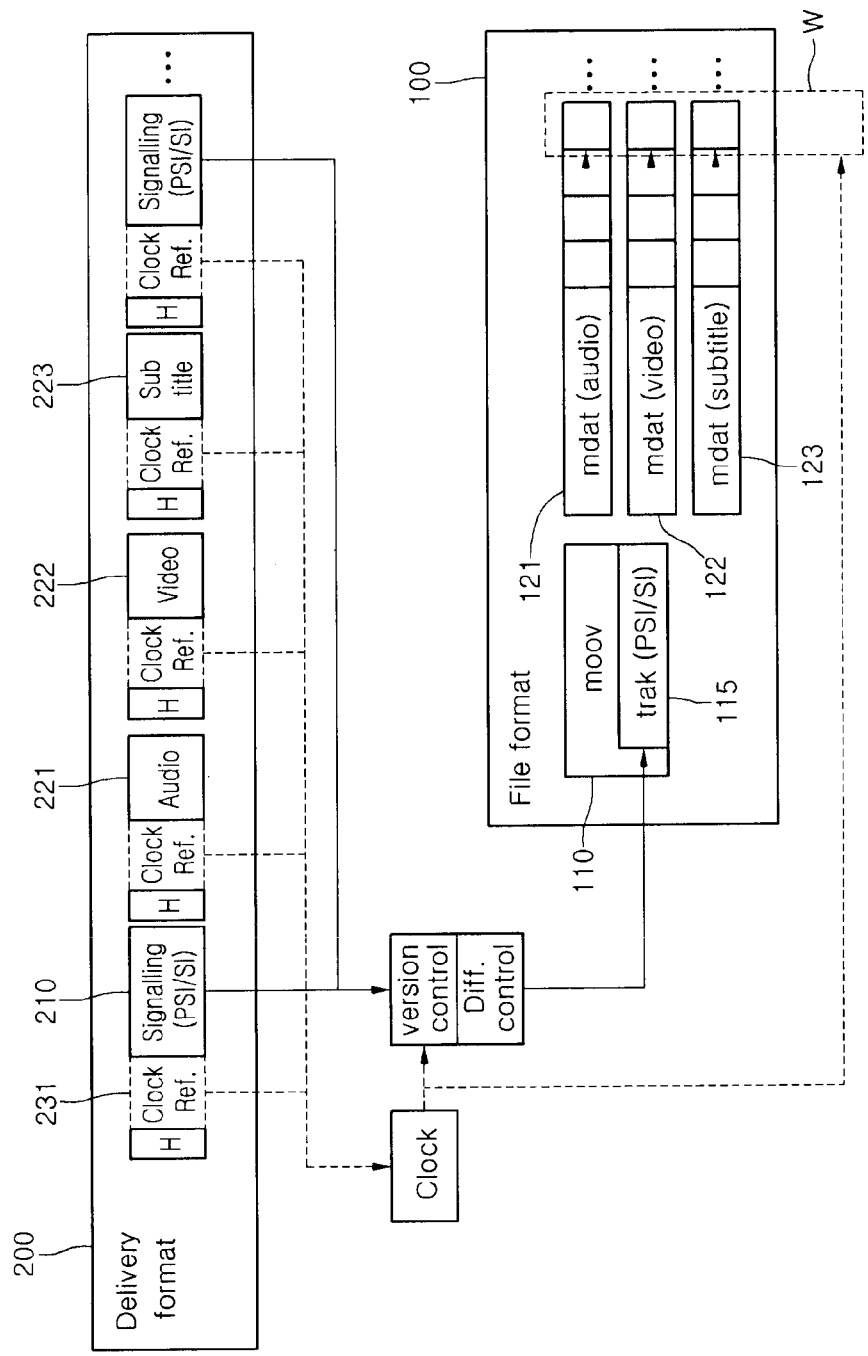
FIGS. 18 and 19 are views illustrating a method of converting a delivery format of contents into a file format according to a first embodiment of the present invention.
Figure 19:
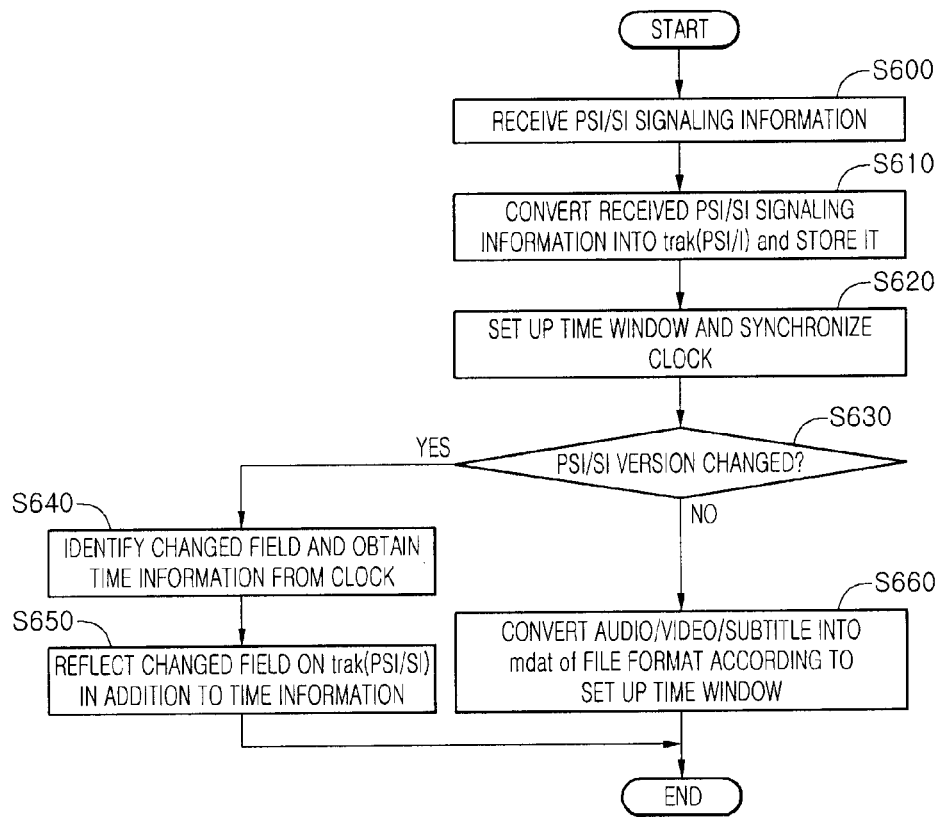

FIGS. 18 and 19 are views illustrating a method of converting a delivery format into a file format, and that is, a method of converting contents received in a delivery format according to an embodiment of the present invention as described with reference to FIG. 11 into the file format according to a first embodiment of the present invention as described with reference to FIGS. 5 to 8 will be described.

Referring to FIG. 18, when contents are received in the file format 200, a reception device may convert the contents received in the delivery format 200 into the file format 100 in order to store the contents.

In this case, the PSI/SI signaling information 210, which is included in the delivery format 200 and transmitted at each predetermined period, may be converted into the trak(PSI/SI) of the file format 100 and may be stored as described with reference to FIGS. 5 to 8.

Additionally, while the contents received in the delivery format 300 are converted into the file format 100, the reception device continuously monitors the version of the PSI/SI signaling information 210 in order to confirm whether the version is updated.

When the version of the PSI/SI signaling information 210 is updated, the reception device compares the previous version thereof 210 with the updated version thereof 210 in order to recognize the changed contents therebetween, and then, reflects information on the changed contents and the changed time on the trak(PSI/SI) configured using the PSI/SI signaling information 210 of the previous version in order to store it.

Moreover, an audio packet stream 221, a video packet stream 222, and a subtitle packet stream 223, which are included in the delivery format and are sequentially received, may be respectively converted into an mdat(audio), an mdat (video), and an mdat(subtitle), and then may be stored.

For example, each of the packet streams is buffered for a predetermined time according to time information and is converted into a corresponding mdat, and also, the packet streams may be identified by the mdat_id field as described with reference to FIG. 11.

When the version of the PSI/SI signaling information 210 is updated, by reflecting the changed contents and the chanted time of the PSI/SI information on the trak(PSI/SI) of the file format 100, information on a section that an mdat included in the file format 100 is used may be included in the program composition information.

Moreover, the above time information (for example, time information for buffering the packet streams and converting them into mdats or time information for reflecting a changed time of the PSI/SI information) may be managed according to a clock of the reception device, and the clock of the reception device may be synchronized with the transmission device of the clock reference value Clock Ref. 231 included in the delivery format 200.

As described with reference to FIG. 18, by converting the PSI/SI signaling information of the delivery format 200 into the trak(PSI/SI) and storing it on the basis of the compatibility of PSI/SI information, contents received in the delivery format 200 may be easily converted into the file format 100.

Figure 20:
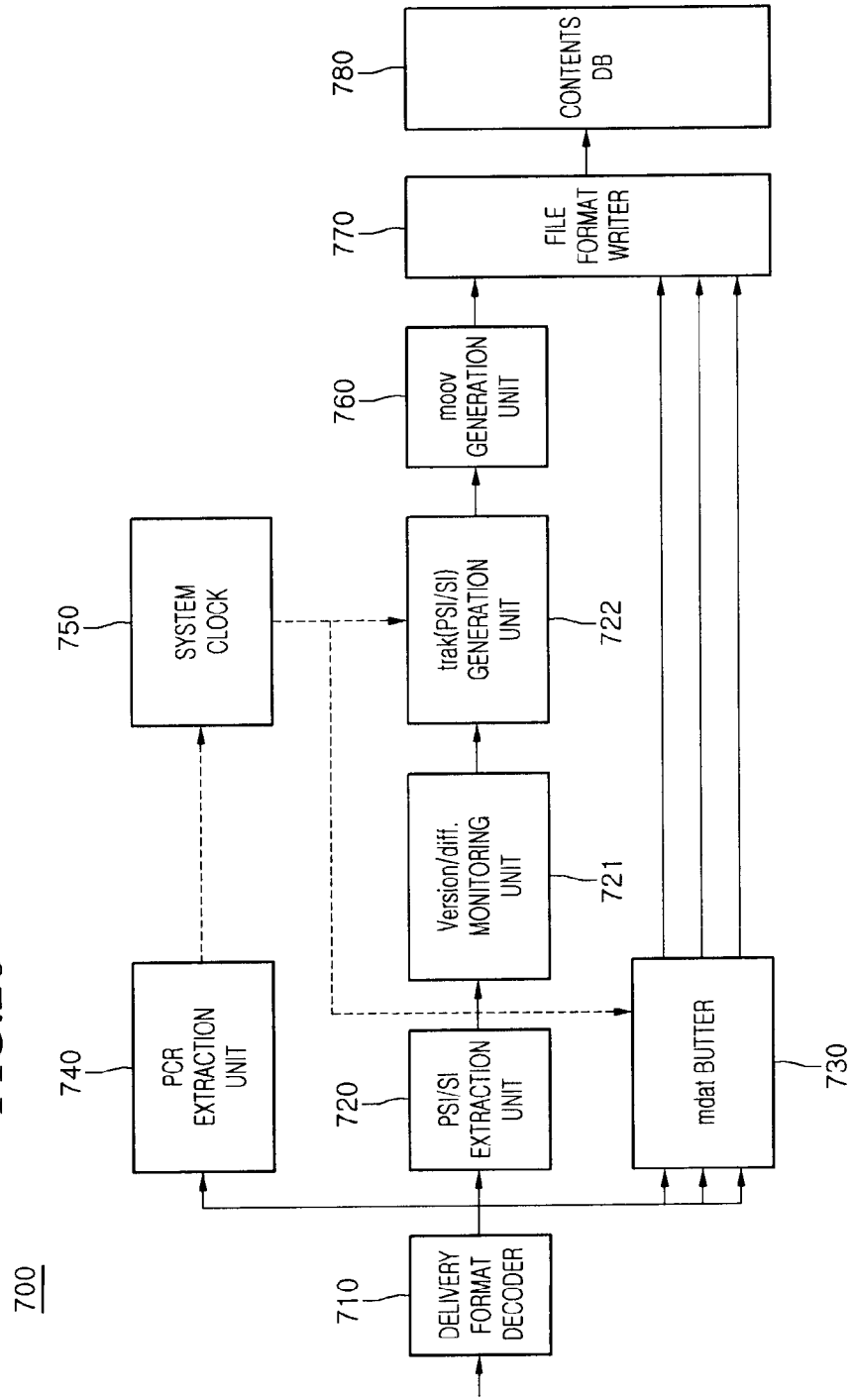
FIG. 20 is a block diagram illustrating a configuration of a contents receiving device according to a first embodiment of the present invention.

FIG. 19 is a flowchart illustrating a method of converting a delivery format into a file format according to an embodiment of the present invention. FIG. 20 is a block diagram illustrating a configuration of a contents receiving device according to a first embodiment of the present invention. Hereinafter, the conversion method shown in FIG. 19 will be described in more detail in linkage with the block diagram shown in FIG. 20.

First, when the reception device shown in FIG. 20 is described briefly, the reception device 700 may include a Delivery format decoder, 710, a PSI/SI extraction unit 720, a Version/diff. monitoring unit 721, a trak(PSI/SI) generation unit 722, an mdat butter 730, a PCR extraction unit 740, a system clock 750, a moon generation unit 760, a File format writer 770, and a contents DB 780.

Moreover, the contents receiving device according to an embodiment of the present invention may include a format conversion unit for converting contents received in a delivery format into a file format and a contents storage unit for storing the contents having the converted file format.

In this case, the format conversion unit of the contents receiving device according to an embodiment of the present invention may include a delivery format decoder 710, a PSI/SI extraction unit 720, a Version/diff. monitoring unit 721, a trak(PSI/SI) generation unit 722, an mdat buffer 730, a moon generation unit 760, and a file format writer 770.

Referring to FIGS. 19 and 20, the reception device 700 extracts the PSI/SI signaling information from the delivery format 200 of the received contents in operation S600, and then, converts the extracted PSI/SI signaling information into a trak(PSI/SI) and stores it.

The delivery format decoder 710 of the reception device 700 decodes and filters the delivery format 200 received through internet, and then, separates the decoded filtered delivery format 200 into PSI/SI signaling information 210, an audio packet stream 221, a video packet stream 222, a subtitle packet stream 223, and a clock reference value 231 and outputs them.

For example, the delivery format decoder 710 may identify that data included in a corresponding packet is which one of the audio packet stream 221, the video packet stream 222, and the subtitle packet stream 223, by using the mdat_id included in the delivery format 200.

The PSI/SI extraction unit 720 extracts the PSI/SI information representing composition information on corresponding contents from the PSI/SI signaling information 210, and also, the trak(PSI/SI) generation unit 722 converts the extracted PSI/SI information into the trak(PSI/SI) of the file format as described with reference to FIGS. 5 to 8, and then, stores it in the contents DB 780.

Additionally, the reception device 700 sets up a time window, and synchronizes the transmission device 400 with a clock in operation S620.

For example, when a PCR is included in the received delivery format 200, the PCR extraction unit 740 extracts a clock reference value 231 of the transmission device 400 from the delivery format 200, and delivers it to the system clock 750.

The system clock 750 may provide the clock synchronized with the transmission device 400 by using the extracted clock reference value 231 to the trak(PSI/SI) generation unit 722 and the mdat buffer 730, and thus, may manage the playback time of the contents received from the transmission device 400.

Then, the reception device 700 confirms whether the version of the PSI/SI signaling information 210 received in the delivery format 200 is changed in operation S630.

If the version of the PSI/SI signaling information 210 is changed, the reception device 700 identifies a changed field among the PSI/SI signaling information 210, and obtains time information from the clock in operation S640.

For example, the Version/diff. monitoring unit 721 may monitor the version of the PSI/SI information inputted from the PSI/SI extraction unit 720 and by doing so, may identify a difference between the PSI/SI information inputted when the version is changed and the PSI/SI information of the previous version in order to extract the changed contents from the PSI/SI information.

In this case, the trak(PSI/SI) generation unit 722 may reflect the changed contents the Version/diff. monitoring unit 721 extracts on the trak(PSI/SI) stored in operation S610 in order to update it.

Additionally, the trak(PSI/SI) generation unit 722 may record the information on the version changed time on the trak(PSI/SI).

For example, when the version of the PSI/SI information is changed, the trak(PSI/SI) generation unit 722 may obtain time information representing the changed time by using the clock provided from the system clock 750, and may update program configuration change information of the trak(PSI/SI) (for example, the start time/duration field values as described with reference to FIG. 6) by using the obtained time information.

As a more specific example, when the Version/diff. monitoring unit 721 determines that the version of the PSI/SI information is changed at the 180 msec time (this is time information synchronized with the transmission device 400 according to the system clock) and the main mdat of an audio type changes from the mdat of 'id1' into the mdat of 'id2', the trak(PSI/SI) generation unit 722 may set each of the duration field value for the mdat of 'id1' and the start_time field value for the mdat of 'id2' to '180'.

The moov generation unit 760 may configure the moov data of the file format 100 in order to include the trak(PSI/SI) inputted from the trak(PSI/SI) generation unit, and then, may output the moov data to the file format writer 770.

Then, the reception device 700 converts an audio/video/subtitle packet stream into an mdat of a file format according to the set up time window, and stores it in operation S660.

For example, the mdat buffer 730 may buffers the audio packet stream 221, the video packet stream 222, and the subtitle packet stream 223, which are separated from the delivery format 200 and then sequentially inputted, for each predetermined time, and then, may deliver them to the file format writer 770.

For this, a plurality of the mdat buffers 730 may be provided in the reception device 700 in order to correspond to each of the audio/video/subtitle packet streams 221, 222, and 223.

In more detail, the mdat buffer 730 may buffer each of the packet streams 221, 222, and 223 during the time required for the configuration of the mdat by using the clock provided from the system clock and the time window set up in operation S620.

Moreover, the file format writer 770 configures an mdat by using the buffered data inputted from the mdat buffer 730, and generates the file format 100 to include the moov data inputted from the moov generation unit 760 and the configured mdat, and then, store them in the contents DB 410.

Moreover, the reception device 700 may store corresponding contents in the file format 100 by repeatedly performing operation S600 to operation S660 shown in FIG. 19 until all data constituting contents are stored in the contents DB 780.

Figure 21:
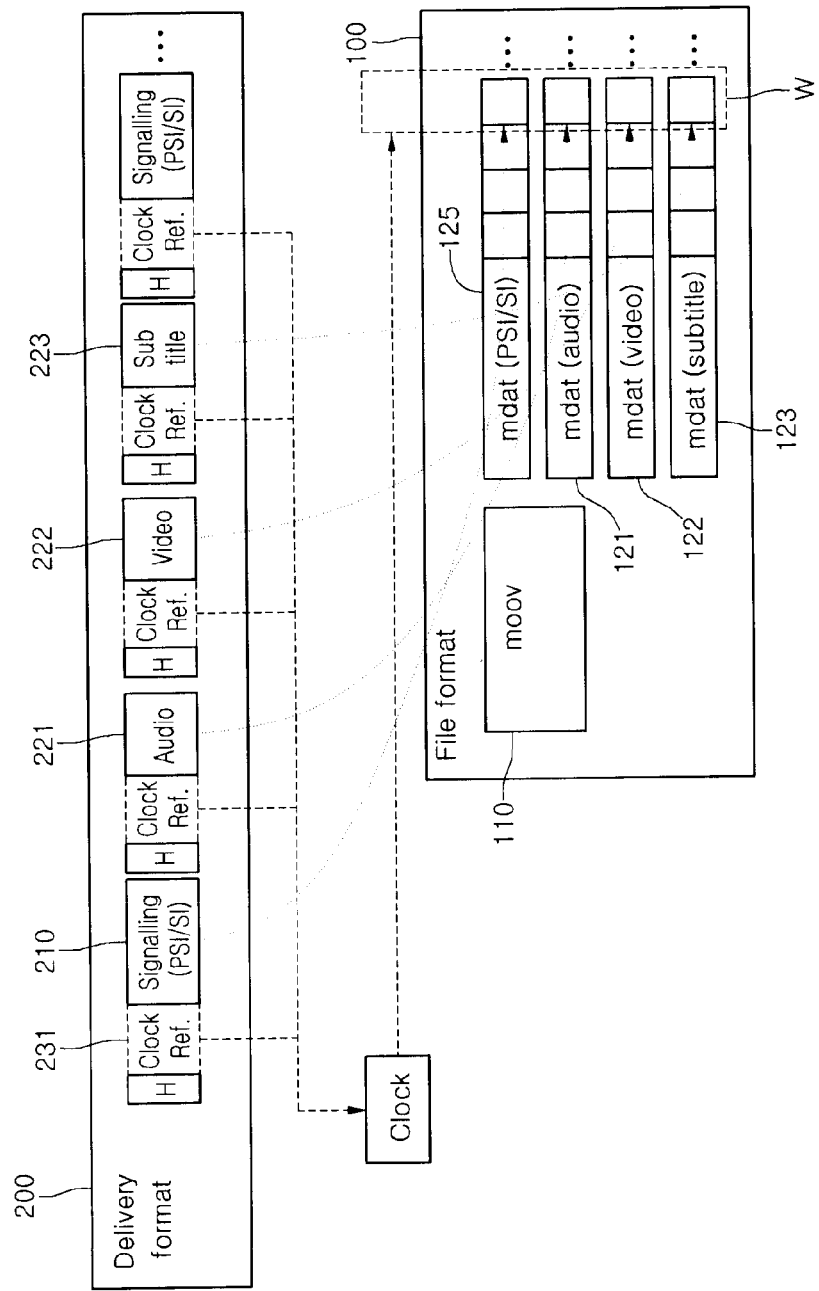
FIGS. 21 and 22 are views illustrating a method of converting a delivery format of contents into a file format according to a second embodiment of the present invention.
Figure 22:
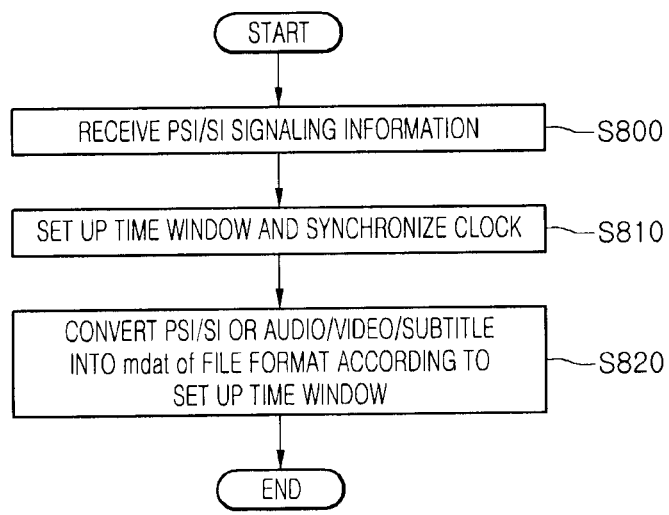

FIGS. 21 and 22 are views illustrating a method of converting a delivery format into a file format according to another embodiment of the present invention, and that is, a method of converting contents received in a delivery format according to an embodiment of the present invention as described with reference to FIG. 11 into the file format according to the second embodiment of the present invention as described with reference to FIGS. 9 to 10 will be described.

Referring to FIG. 21, the reception device PSI/SI signaling information 210, an audio packet stream 221, a video packet stream 222, and a subtitle packet stream 223, which are included in the delivery format 200 and are sequentially received, may be respectively converted into an mdat(PSI/SI) 125, an mdat(audio) 121, an mdat(video) 122, and an mdat(subtitle) 123, and then may be stored.

For example, each of the packet streams 210, 221, 222, and 223 is buffered for a predetermined time and is converted into a corresponding mdat, and also, the packet streams may be identified by the mdat_id field as described with reference to FIG. 11.

In this case, since the mdat(PSI/SI) 125 of the file format 100 includes the PSI/SI information where all changed contents are reflected, the reception device buffers the sequentially received PSI/SI signaling information 210 as it is for a predetermined time, thereby constituting the mdat(PSI/SI) 125.

That is, a conversion method according to further another embodiment of the present invention may not include version monitoring and changed contents extraction processes as described with reference to FIGS. 18 to 20.

Moreover, the time information for buffering the packet streams and converting them into mdats may be managed by the clock of the reception device. The clock of the reception device may be synchronized with the transmission device of the clock reference value Clock Ref. 231 included in the delivery format 200.

FIG. 22 is a flowchart illustrating a method of converting a delivery format into a file format according to further another embodiment of the present invention. FIG. 23 is a block diagram illustrating a configuration of a contents receiving device according to a second embodiment of the present invention. Hereinafter, the conversion method of FIG. 22 will be described in more detail in linkage with the block diagram shown in FIG. 23. Moreover, detailed description for the same components described with reference to FIG. 20 in the configuration of the reception device 700 shown in FIG. 23 will be omitted hereinafter.

Figure 23:
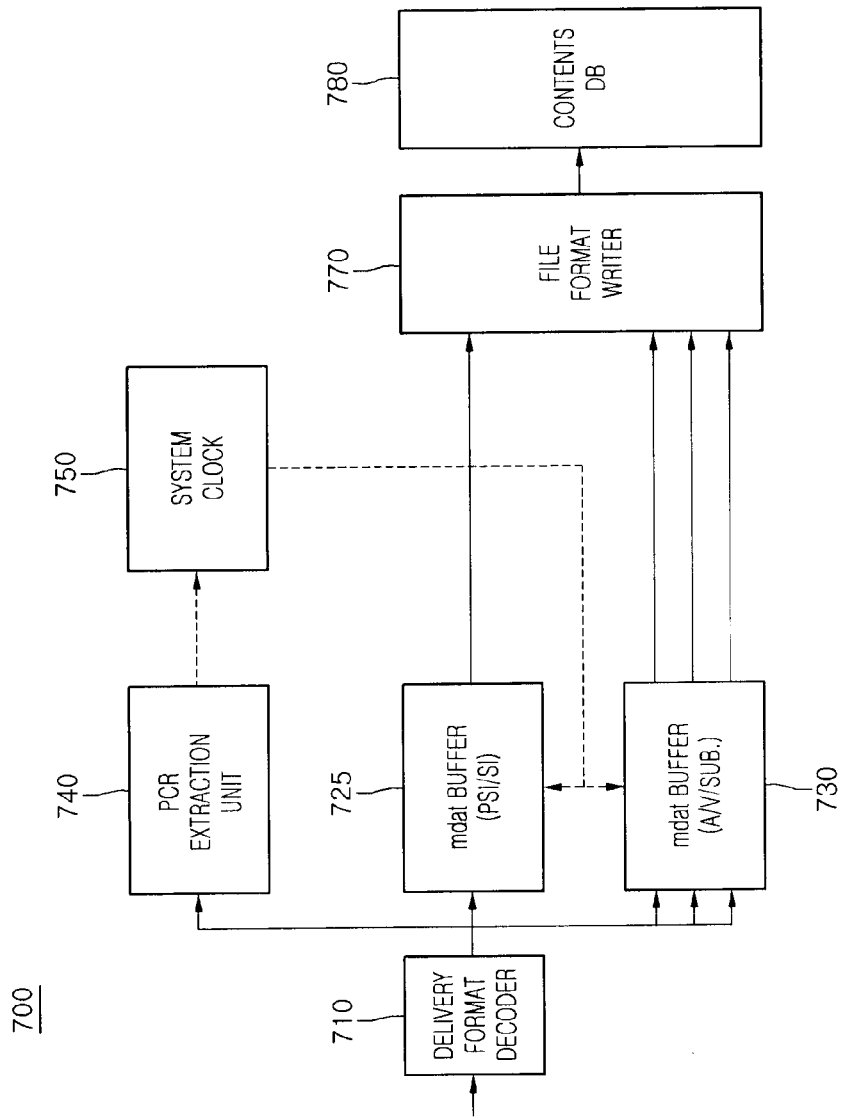
FIG. 23 is a block diagram illustrating a configuration of a contents receiving device according to a second embodiment of the present invention.

Moreover, the format conversion unit of the contents receiving device according to further another embodiment of the present invention may include a delivery format decoder 710, an mdat buffer(PSI/SI) 725, an mdat buffer (A/V/sub.) 730, and a file format writer 770 shown in FIG. 23.

Referring to FIGS. 22 and 23, the reception device 700 extracts the PSI/SI information from the delivery format 200 of the received contents in operation S800.

For example, the mdat buffer(PSI/SI) 725 equipped in the reception device 700 may buffer the PSI/SI signaling information 210, which is separated from the delivery format 200 and sequentially inputted, for a predetermined time, and then, may deliver it to the file format writer 770.

Moreover, in the case of the file format 100 as shown in FIG. 21, since the PSI/SI signaling information 210 is buffered for a predetermined time as it is in order to constitute the mdat(PSI/SI), the reception device 700 according to the second embodiment of the present invention may not include the version/diff. monitoring unit 721 as shown in FIG. 20.

The reception device 700 sets up a time window and synchronizes the transmission 400 with the clock in operation S810.

For example, the system clock 750 may provide the clock synchronized with the transmission device 400 to the mdat buffer(PSI/SI) 725 and the mdat buffer(A/V/Sub.) 730 by using the clock reference value 231 extracted from the delivery format 200, and thus, may manage the playback time of the contents received from the transmission device 400.

Then, the reception device 700 converts the PSI/SI or audio/video/subtitle packet stream into an mdat of a file format according to a set up time window and stores it in operation S820.

For example, the mdat buffer(A/V/Sub.) 730 may buffer an audio packet stream 221, a video packet stream 222, and a subtitle packet stream 223, which are separated from the delivery format 200 and are sequentially inputted, for a predetermined time, and then, may deliver it to the file format writer 770.

The file format writer 770 may constitute the mdat(PSI/SI) 125 by using the buffered data inputted from the mdat buffer (PSI/SI)(725), and also may constitute an mdat(audio) 121, an mdat(video) 122, and an mdat(subtitle) 123 by using the buffered data inputted from the mdat buffer(A/V/Sub.) 730 in order to generate the file format 100.

Moreover, the reception device 700 may store corresponding contents in the file format 100 by repeatedly performing operation S800 to S820 shown in FIG. 22 until all data constituting contents are stored in the contents DB 780.

The internet based contents receiving and processing methods as described with reference to FIGS. 1 to 23 may be performed by an IPTV receiver according to an embodiment of the present invention.

For this, the IPTV receiver may receive contents in a delivery format from a transmission side (for example, a service provider such as a broadcasting station), and the delivery format of the contents may have the same configuration as described with reference to FIG. 1.

Additionally, the IPTV receiver may convert the contents of the delivery format into a file format, and then may store it in a storage medium therein, and also, the file format of the contents may have the same configuration as described with reference to FIGS. 4 to 10.

Moreover, the IPTV receiver may convert the contents of the delivery format into a file format through the conversion method as described with reference to FIGS. 18 to 23.

Hereinafter, referring to FIGS. 24 to 25, the configuration of an IPTV receiver according to an embodiment of the present invention will be described in more detail with reference to FIGS. 24 and 25.

Figure 24:
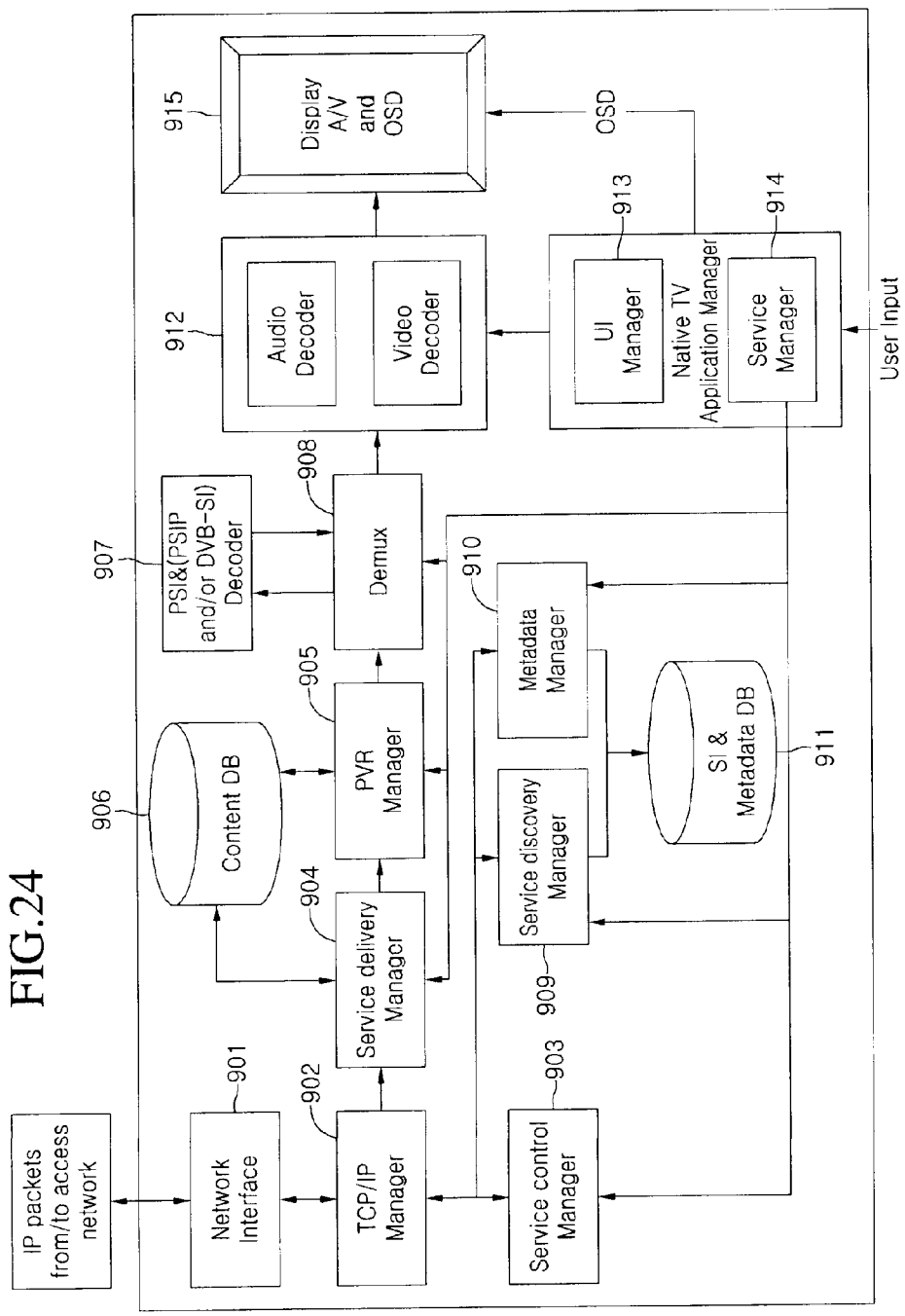
FIG. 24 is a block diagram illustrating a configuration of an IPTV receiver according to a first embodiment of the present invention.

FIG. 24 is a block diagram illustrating a configuration of an IPTV receiver according to an embodiment of the present invention.

The IPTV receiver according to an embodiment of the present invention may include an additional tuner in order to receive terrestrial wave broadcast, cable broadcast, and satellite broadcast. However, in the present invention, for convenience of description, a configuration for receiving an IPTV service provided through an IP network will be mainly described.

Additionally, an ITF represents an Open IPTV Terminal Function, and also refers to a receiver including a function module necessary for supporting IPTV service.

The IPTV receiver may include a Network Interface 901, a TCP/IP Manager 902, a Service Delivery Manager 904, a PVR Manager 905, a Demux 908, a Data Decoder 907, an Audio/Video Decoder 912, an A/V Display & OSD Module 915, Application Managers 913 and 914, a SI & Metadata DB 911, a Service Discovery Manager 909, a Service Control Manager 903, a Metadata Manager 910, and a Content DB 906.

Referring to FIG. 24, the network interface 901 receives packets from a network and transmits packets to the network. That is, the network interface 901 receives service and contents from a service provider through a network.

The TCP/IP manager 902 is involved in delivering the packet from a source to a destination, with respect to packets received by the IPTV receiver and packets transmitted from the IPTV receiver. Furthermore, the TCP/IP manager 902 classifies the received packets in correspondence to a proper protocol, and then, outputs the packets classified into the Service Delivery Manager 904, the Service Discovery Manager 909, the Service Control Manager 903, and the Metadata Manager 910.

The service delivery manager 904 is responsible for controlling the received service data. For example, when realtime streaming data are controlled, RTP/RTCP may be used.

When the realtime streaming data are transmitted using RTP, the service delivery manager 904 may parse the received data packet according to RTP, and then, may transmit it to the Demux 908 or may store it in the contents DB 906 according to a control of the service manager 914. Additionally, the service delivery manager 904 feeds the network reception information to a service providing server through RTCP.

The Demux 908 demultiplexes the received packets into audio, video, Program Specific Information (PSI) data, and then, respectively transmits them to the Audio/Video Decoder 912 and the Data Decoder 907.

The Data Decoder 907 decodes service information such as Program Specific Information (PSI), for example. That is, the data decoder 907 receives and decodes a PSI section, a Program and Service Information Protocol (PSIP) section, or a DVB-Service Information (SI) section, which are demultiplexed in the Demux 908.

Additionally, the data decoder 907 decodes the received sections and creates a database relating to service information, and the database relating to service information is stored in the The Audio/Video Decoder 912 decodes the video data and audio data received from the Demux 908. The video data and audio data decoded by the Audio/Video Decoder 912 are provided to a user through the display unit 915.

The application manager manages the overall state of the IPTV receiver, provides a user interface, and manages another manager. For this, the application manager includes a User Interface Manager 913 and a service manager 914.

The Graphic User Interface (GUI) for user through an On Screen Display (OSD), and performs an operation of a receiver according to a key input from a user. For example, when a key input on channel selection is received from a user, the key input signal is transmitted to the service manager 914.

The service manager 914 controls a manager related to service such as the Service Delivery Manager 904, the Service Discovery Manager 909, the Service Control Manager 903, and the Metadata Manager 910.

Additionally, the service manager 914 creates a Channel Map and selects a channel by using the channel map according to a key input received from the user interface manager 913. Then, the service manager 914 receives service information on a channel from the data decoder 907, and sets an audio/video Packet Identifier (PID) of the selected channel in the Demux 908.

The Service Discovery Manager 909 provides information necessary for selecting a service provider that provides service. When a signal on channel selection is received from the service manager 914, the service discovery manager 909 searches for service by using the information.

The service control manager 903 is responsible for service selection and control. For example, when a user selects a Live Broadcasting service similar to existing broadcasting type, the service control manager 903 uses IGMP or RTSP, and when a user selects a service such as Video On Demand (VOD), the service control manager 903 uses RTSP in order to select and control the service.

The RTSP may provide a trick mode for realtime streaming. Additionally, the service control manager 903 initializes a session through an IMC gateway by using IP Multimedia Subsystem (IMS) and Session Initiation Protocol (IMS). The protocols are one embodiment, and other protocols may be used according to an implementation example.

The metadata manager 910 manages service related metadata and stores the metadata in the SI&Metadata DB 911.

The SI & Metadata DB 911 may store the service information decoded by the Data Decoder 907, the metadata that the metadata manager 910 manages, and the information necessary for selecting a service provider that the service discovery manager 909 provides. Additionally, the SI & Metadata DB 911 may store setup data for system.

The SI & Metadata DB 911 and the NonVolatile RAM (NVRAM) or flash memory, or may be implemented using two areas that are logically separated on the same storage area.

The PVR Manager 905 collects metadata on recorded contents and creates supplement information provided to a user through thumbnail image or index, as a module for recording live streaming contents and playing them Functions of a control unit in the IPTV receiver according to an embodiment of the present invention are separated and implemented by a plurality of modules such as the TCP/IP Manager 902, the Service Delivery Manager 904, the PVR Manager 905, the Application Managers 913 and 914, the Service Discovery Manager 909, the Service Control Manager 903, and the Metadata Manager 910, shown in FIG. 24.

For example, the TCP/IP Manager 902 filters SD&S information by using the above-mentioned target package information in order to control the Network Interface 902 to request only the payload or segment corresponding to a specific package (for example, a package that an IPTV receiver subscribes) to a server and receive it.

Or, the TCP/IP Manager 902 filters SD&S information, which is received in a multicast way, by using the target package information in order to allow the data decoder 907 to parse and process only the payload or segment corresponding to a specific package.

FIG. 25 is a block diagram illustrating a configuration of an IPTV receiver according to an embodiment of the present invention, and that is, a configuration of an IPTV receiver is represented with functional blocks. The solid arrow shown in FIG. 25 corresponds to a data path, and the dashed arrow corresponds to a control signal path.

A Cable modem, a DSL modem, etc(1001) demodulates a signal transmitted through a physical medium and restores the digital signal, as an interface that allows an ITF to be connected to an IP Network in a physical level.

An Ethernet NIC 1002 restores the signal, which is received through the physical interface, to IP data, and an IP Network Stack 1007 processes each layer according to an IP Protocol stack.

Additionally, an XML Parser 1009 parses MXL Document in the received IP data, and a File Handler 1008 processes data, which are transmitted in a file format through FLUTE, among the received IP data.

A SI Handler 1011 may process a portion corresponding to the IPTV service information among the received data of the file format and then may store it in a storage 1012, and the EPG Handler 1010 may process a portion corresponding to the IPTV EPG information among the received data of the file format and then may store it in the storage 1012.

The Storage 1012 stores various data such as the SI and the EPG.

An SI Decoder 1013 receives SI data from the storage 1012 and analyzes them in order to obtain channel map information, and an EPG Decoder 1014 analyzes the EPG data stored in the Storage 1012 in order to restore information necessary for an EPG configuration.

An ITF Operation Controller 1015 is a main controller for controlling an operation of an ITF such as Channel change or EPGP display.

A Channel Service Manager 1016 may perform an operation such as channel change according to a user input, and an Application Manager 1017 may perform Application service such as EPG Display according to a user input.

An MPEG-2 Demultiplexer 1003 may extract MPEG-2 Transport Stream data from the received IP Datagram, and may deliver them to a corresponding module according to packet identification information (PID).

Additionally, an MPEG-2 PSI/PSIP Parser 1004 may extract PSI/PSIP data, which includes packet identification information (PID) on A/V data or access information on a program element, from the MPEG-2 Transport Stream, and then, may parse them.

Moreover, an A/V Decoder 1005 may decode the inputted Audio and Video data and then, may deliver them to a display module 1006. The Display module 1006 may output the decoded A/V data or application.

The contents transmitting/receiving method according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and further includes carrier waves (such as data transmission through the Internet.

The computer readable recording medium can also be distributed over network coupled computer systems so that the computer readable code is stored and executed in a distributed fashion. (Also, functional programs, codes, and code segments for accomplishing the present invention can be easily construed by programmers skilled in the art to which the present invention pertains.)

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of transmitting one or more media contents data entities composing a program, the method comprising:
encapsulating the one or more media contents data entities into files of an ISO/IEC 14496-12 ISO Base Media file format (ISOBMFF);
converting the files of the ISOBMFF into a first one or more packets of a delivery format;
converting signaling information including composition information for the one or more media contents data entities into a second one or more packets of the delivery format; and transmitting the first one or more packets of the delivery format and the second one or more packets of the delivery format,
wherein each media contents data entity is each video of multi-video or each audio of multi-audio of the program,
wherein the composition information includes:
one or more identifiers for identifying the one or more media contents data entities, respectively,
a start time representing start time for the each media contents data entity and representing adding or changing of the one or more media contents data entity during playing of the program,
an end time representing end time for the each media contents data entity and representing adding or changing of the one or more media contents data entity during playing of the program.

2. The method of claim 1, wherein the one or more media contents data entities correspond to video data, audio data, image data or subtitle data.

3. The method of claim 1, wherein the first one or more packets of the delivery format comprises indicator information for representing whether time information for synchronization is inserted in the packet.

4. The method of claim 1, wherein the composition information is cut according to a time window and is transmitted at a predetermined period.

5. The method of claim 1, wherein transmitting the multiplexed packets comprises:
transmitting the multiplexed packets by using internet protocol (IP) packets.

6. A method of receiving one or more media contents data entities composing a program, the method comprising:
receiving packets;
demultiplexing the packets into a first one or more packets of a delivery format and a second one or more packets of the delivery format;
extracting signaling information, from the second one or more packets of the delivery format, including composition information; and
extracting files of an ISO/IEC 14496-12 ISO Base Media file format(ISOBMFF) from the first one or more packets of the delivery format; and
extracting the one or more media contents data entities from the files of the ISOBMFF,
wherein each media contents data entity is each video of multi-video or each audio of multi-audio of the program,
wherein the composition information includes:
one or more identifiers for identifying the one or more media contents data entities, respectively,
a start time representing start time for the each media contents data entity and representing adding or changing of the one or more media contents data entity during playing of the program,
an end time representing end time for the each media contents data entity and representing adding or changing of the one or more media contents data entity during playing of the program.

7. The method of claim 6, wherein extracting the files of the ISOBMFF further comprises:
synchronizing a transmitter with a clock by using time information in the first one or more packets of the delivery format.

8. The method of claim 7, wherein synchronizing the transmitter with the clock comprises:
checking whether the packets have the time information by using indicator information in the first one or more packets of the delivery format; and
extracting the time information from the first one or more packets of the delivery format.

9. The method of claim 6, wherein extracting the files of the ISOBMFF comprises:
buffering the packets for a predetermined time according to a time window to constitute the composition information.

10. The method of claim 6, wherein receiving the packets comprises:
receiving the multiplexed packets by using internet protocol (IP) packets through an internet.

11. A device of transmitting one or more media contents data entities composing a program, the method comprising:
an encapsulating unit for encapsulating the one or more media contents data entities into files of an ISO/IEC 14496-12 ISO Base Media file format (ISOBMFF);
a format conversion unit for converting the files of the ISOBMFF into a first one or more packets of a delivery format, and for converting signaling information including composition information for the one or more media contents data entities into a second one or more packets of the delivery format; and
a packet transmission unit for transmitting the first one or more packets of the delivery format and the second one or more packets of the delivery format packets,
wherein each media contents data entity is each video of multi-video or each audio of multi-audio of the program,
wherein the composition information includes:
one or more identifiers for identifying the one or more media contents data entities, respectively,
a start time representing start time for the each media contents data entity and representing adding or changing of the one or more media contents data entity during playing of the program,
an end time representing end time for the each media contents data entity and representing adding or changing of the one or more media contents data entity during playing of the program.

12. The device of claim 11, wherein the conversion unit comprises:
a loader for loading the composition information and the one or more media contents data entities from the contents box of the file format; and
a scheduler for sequentially streaming the composition information and the one or more media contents data entities inputted from the loader, according to the time window.

13. The device of claim 11, wherein the packet transmission unit comprises:
a delivery header insertion unit for generating header and inserting generated header into the first one or more packets of the delivery format and the second one or more packets of the delivery format; and
an internet frontend for performing encoding for internet transmission on the header-inserted packets.

14. A device of receiving one or more media contents data entities composing a program, the method comprising:
a receiving unit for receiving packets;
a demultiplexing unit for demultiplexing the packets into extracting a first one or more packets of a delivery format and a second one or more packets of the delivery format;
a format conversion unit for extracting the second one or more packets of the delivery format into signaling information including composition information, and for extracting the first one or more packets of the delivery format into files of an ISO/IEC 14496-12 ISO Base Media file format (ISOBMFF); and
a decapsulating unit for decapsulating the files of the ISOBMFF into the one or more media contents data entities, wherein each media contents data entity is each video of multi-video or each audio of multi-audio of the program, wherein the composition information includes:

one or more identifiers for identifying the one or more media contents data entities, respectively, a start time representing start time for the each media contents data entity and representing adding or changing of the one or more media contents data entity during playing of the program, an end time representing end time for the each media contents data entity and representing adding or changing of the one or more media contents data entity during playing of the program.

15. The device of claim 14, wherein the format conversion unit comprises:

a buffer for buffering the packets for the program composition information and the packets for the one or more media contents data entities, which are sequentially received through IP packets, for a predetermined time according to a time window; and a file format generator for generating the composition information and the one or more media contents data entities by using the packets for the composition information and the one or more media contents data entities inputted from the buffer.

16. The device of claim 14, further comprising:

a PCR extraction unit for extracting a clock reference value of a transmitter from the first one or more packets of the delivery format in order to synchronize a system clock with the transmitter.

* * * * *